United States Patent
Adachi et al.

(10) Patent No.: US 9,717,049 B2
(45) Date of Patent: Jul. 25, 2017

(54) WIRELESS COMMUNICATION APPARATUS AND METHOD

(71) Applicants: Tomoko Adachi, Kawasaki (JP); Tomoya Tandai, Tokyo (JP); Takeshi Tomizawa, Yokohama (JP); Ryoko Matsuo, Tokyo (JP)

(72) Inventors: Tomoko Adachi, Kawasaki (JP); Tomoya Tandai, Tokyo (JP); Takeshi Tomizawa, Yokohama (JP); Ryoko Matsuo, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 67 days.

(21) Appl. No.: 13/724,618

(22) Filed: Dec. 21, 2012

(65) Prior Publication Data

US 2013/0230040 A1 Sep. 5, 2013

(30) Foreign Application Priority Data

Mar. 1, 2012 (JP) .................................. 2012-045732

(51) Int. Cl.
*H04W 52/02* (2009.01)

(52) U.S. Cl.
CPC ......... *H04W 52/0209* (2013.01); *Y02B 60/50* (2013.01)

(58) Field of Classification Search
CPC ......... H04W 52/0209; H04W 52/0251; H04W 52/0229; H04W 52/0232; H04L 1/0044; H04L 1/187; H04L 1/1621; H04L 1/1628; H04L 1/1635; H04L 47/22; H04L 47/225; H04L 47/27; Y02B 60/50

(Continued)

(56) References Cited

U.S. PATENT DOCUMENTS 5,568,476 A 10/1996 Sherer et al.
5,974,028 A * 10/1999 Ramakrishnan ...... H04L 1/1614
                                                          370/229

(Continued)

FOREIGN PATENT DOCUMENTS

EP    1 333 618 A2   8/2003
JP    8-242243 A     9/1996

(Continued)

OTHER PUBLICATIONS

Wikipedia, "Frame (networking)" retrieved Apr. 15, 2016.*

(Continued)

*Primary Examiner* — Mark Rinehart
*Assistant Examiner* — Kenneth P Hunt
(74) *Attorney, Agent, or Firm* — Holtz, Holtz & Volek PC

(57) ABSTRACT

According to one embodiment, a wireless communication apparatus includes a first processor, a second processor and a controller. The first processor generates one or more first frames and one or more second frames. The second processor transmits the first frames and the second frames, and receives a first acknowledgement and a second acknowledgement. The controller retains a first interval relating to a time interval between the first transmission request and the second transmission request and a second interval relating to a time interval between a first and a second time points, and controls transmission of frames to be transmitted based on the first and the second intervals.

19 Claims, 12 Drawing Sheets

(58) Field of Classification Search
USPC .......................................................... 370/349
See application file for complete search history.

(56) References Cited

U.S. PATENT DOCUMENTS

| | | | |
|---|---|---|---|
| 6,400,724 | B1 | 6/2002 | Yao |
| 6,463,096 | B1* | 10/2002 | Raleigh .................... H04J 4/00 370/473 |
| 6,646,987 | B1* | 11/2003 | Qaddoura ............... H04L 41/00 370/231 |
| 7,142,540 | B2 | 11/2006 | Hendel et al. |
| 7,328,026 | B2 | 2/2008 | Gu et al. |
| 7,379,494 | B2* | 5/2008 | Raleigh .................... H04J 4/00 375/221 |
| 7,496,076 | B2 | 2/2009 | Takagi et al. |
| 7,650,559 | B2 | 1/2010 | Nishibayashi et al. |
| 7,668,143 | B2 | 2/2010 | Nagata et al. |
| 7,675,893 | B2 | 3/2010 | Takagi et al. |
| 7,697,561 | B2 | 4/2010 | Nishibayashi et al. |
| 7,706,408 | B2 | 4/2010 | Takagi et al. |
| 7,743,310 | B2 | 6/2010 | Nishibayashi et al. |
| 7,746,842 | B2 | 6/2010 | Sugaya |
| 7,752,519 | B2 | 7/2010 | Yeo et al. |
| 7,856,031 | B2* | 12/2010 | Kwon .................. H04L 12/2602 370/431 |
| 7,898,962 | B2* | 3/2011 | Hiddink .................. H04L 47/10 370/236 |
| 8,180,409 | B2* | 5/2012 | Karaoguz ............ H04B 1/1615 455/528 |
| 8,254,867 | B2 | 8/2012 | Kwon et al. |
| 8,347,199 | B2 | 1/2013 | Lawson et al. |
| 8,612,752 | B2 | 12/2013 | Batta |
| 8,699,337 | B2* | 4/2014 | Shimonishi ......... H04L 41/0896 370/230 |
| 8,804,600 | B2* | 8/2014 | Suda ...................... H04B 7/155 370/315 |
| 2003/0220076 | A1 | 11/2003 | Katayama et al. |
| 2005/0259577 | A1* | 11/2005 | Sin .......................... H04L 1/188 370/229 |
| 2005/0265302 | A1 | 12/2005 | Nishibayashi et al. |
| 2006/0218264 | A1* | 9/2006 | Ogawa .................... H04L 47/10 709/223 |
| 2006/0280204 | A1 | 12/2006 | Nagata et al. |
| 2007/0047574 | A1* | 3/2007 | Ling .................. H04L 29/06027 370/465 |
| 2008/0025216 | A1* | 1/2008 | Singh .................... H04L 47/10 370/231 |
| 2008/0037420 | A1* | 2/2008 | Tang ...................... H04L 1/1607 370/229 |
| 2008/0062957 | A1* | 3/2008 | Narasimha ........ H04W 52/0216 370/350 |
| 2008/0070614 | A1 | 3/2008 | Ogushi et al. |
| 2008/0101290 | A1* | 5/2008 | Sung ...................... H04L 1/1825 370/331 |
| 2008/0240322 | A1 | 10/2008 | Date |
| 2009/0089577 | A1 | 4/2009 | Shon et al. |
| 2009/0180384 | A1* | 7/2009 | Ansari .................... H04L 47/10 370/235 |
| 2009/0193310 | A1* | 7/2009 | Hashimoto .................... 714/749 |
| 2009/0268747 | A1* | 10/2009 | Kurata .................. H04L 1/1832 370/412 |
| 2009/0291639 | A1 | 11/2009 | Namekawa et al. |
| 2010/0027461 | A1* | 2/2010 | Bothorel ............ H04B 7/18506 370/316 |
| 2010/0046437 | A1 | 2/2010 | Nishibayashi et al. |
| 2010/0046518 | A1 | 2/2010 | Takagi et al. |
| 2010/0128645 | A1* | 5/2010 | Lin et al. ..................... 370/311 |
| 2010/0166015 | A1 | 7/2010 | Van Greunen et al. |
| 2010/0220639 | A1 | 9/2010 | Sugaya |
| 2010/0232452 | A1 | 9/2010 | Takagi et al. |
| 2011/0065442 | A1* | 3/2011 | Kim ...................... H04W 12/06 455/450 |
| 2012/0026905 | A1* | 2/2012 | Sugiyama ........... H04L 12/2697 370/252 |
| 2012/0027027 | A1 | 2/2012 | Yamaura et al. |
| 2012/0106535 | A1 | 5/2012 | Horiguchi |
| 2012/0201177 | A1 | 8/2012 | Adachi et al. |
| 2014/0177462 | A1* | 6/2014 | Okada ................ H04L 43/0858 370/252 |
| 2014/0198658 | A1* | 7/2014 | Ajima ................ H04L 43/0888 370/235 |

FOREIGN PATENT DOCUMENTS

| | | |
|---|---|---|
| JP | 2001-028565 A | 1/2001 |
| JP | 2002-300175 A | 10/2002 |
| JP | 2003-087185 A | 3/2003 |
| JP | 2003-244166 A | 8/2003 |
| JP | 2004-320153 A | 11/2004 |
| JP | 2004-343567 A | 12/2004 |
| JP | 2005117349 A | 4/2005 |
| JP | 2005-198214 A | 7/2005 |
| JP | 2005-252897 A | 9/2005 |
| JP | 2005-318487 A | 11/2005 |
| JP | 2005341441 A | 12/2005 |
| JP | 2006-042322 A | 2/2006 |
| JP | 2006054673 A | 2/2006 |
| JP | 2006352897 A | 12/2006 |
| JP | 2007-520113 A | 7/2007 |
| JP | 2007-267082 A | 10/2007 |
| JP | 2008-227855 A | 9/2008 |
| JP | 2008-258756 A | 10/2008 |
| JP | 2009-278267 A | 11/2009 |
| JP | 2009284355 A | 12/2009 |
| JP | 2010-206304 A | 9/2010 |
| JP | 2012165139 A | 8/2012 |
| JP | 5475790 B2 | 4/2014 |

OTHER PUBLICATIONS

Wikipedia "OSI Model," retrieved Apr. 15, 2016.*
Wikipedia, "Transmission Control Protocol," retrieved Apr. 15, 2016.*
Deering and Hinden, "Request for Comments: 2460," Dec. 1998.*
Information Sciences Institute University of Southern California, "RFC 793 Transmission Control Protocol." Sep. 1981.*
Wikipedia, "PHY (Chip)" Jul. 16, 2016 https://en.wikipedia.org/wiki/PHY_(chip).*
Scott Harney "TCP/IP—the OSI Model" retrieved Sep. 22, 2016 https://www.scottharney.com/tcp-ip-class/x30.html.*
Joe Casad "TCP/IP and the OSI Model" Jan. 18, 2012 http://www.informit.com/articles/article.aspx?p=1807488&segNum=2.*
Wikipedia "Go-Back-N ARQ" Apr. 13, 2016 https://en.wikipedia.org/wiki/Go-Back-N_ARQ.*
U.S. Appl. No. 13/223,688, filed Sep. 1, 2011: First Named Inventor: Tomoko Adachi: Title: "Wireless Communication Terminal".
U.S. Appl. No. 13/343,336, filed Jan. 4, 2012: First Named Inventor: Tomoya Horiguchi: Title: "Wireless Communication Device and Communication Program".
IEEE Std 802.11n-2009: Local and Metropolitan Area Networks: pp. 30-34 (in English).
IEEE Std 802.11-2007: Local and Metropolitan Area Networks—Specific Requirements: pp. 76 and 77 (in English).
Applicant-provided Background Art Information Sheet.
U.S. Appl. No. 14/176,917, filed Feb. 10, 2014, First Named Inventor: Tomoko Adachi, Title: "Wireless Communication Terminal".
Japanese Office Action (and English translation thereof) dated Jun. 16, 2015, issued in counterpart Japanese Application No. 2012-045732.
Japanese Office Action (and English translation thereof) dated Mar. 31, 2015, issued in counterpart Japanese Application No. 2012-045732.
"Part 11: Wireless LAN Medium Access Control (MAC) and Physical Layer (PHY) Specifications", LAN MAN Standards Committee; IEEE Std 802.11-2007; Jun. 12, 2007; pp. 1-1232.
Jacob, "Deterministic Channel Modeling for 60 GHz WLAN", IEEE 802.11-09/0302r0; Mar. 2009; pp. 1-20.

(56) References Cited

OTHER PUBLICATIONS

Japanese Office Action (and English translation thereof) dated Feb. 23, 2016, issued in counterpart Japanese Application No. 2014-207462.

* cited by examiner

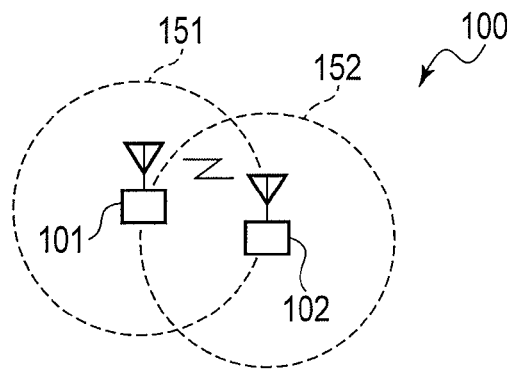
F I G. 1
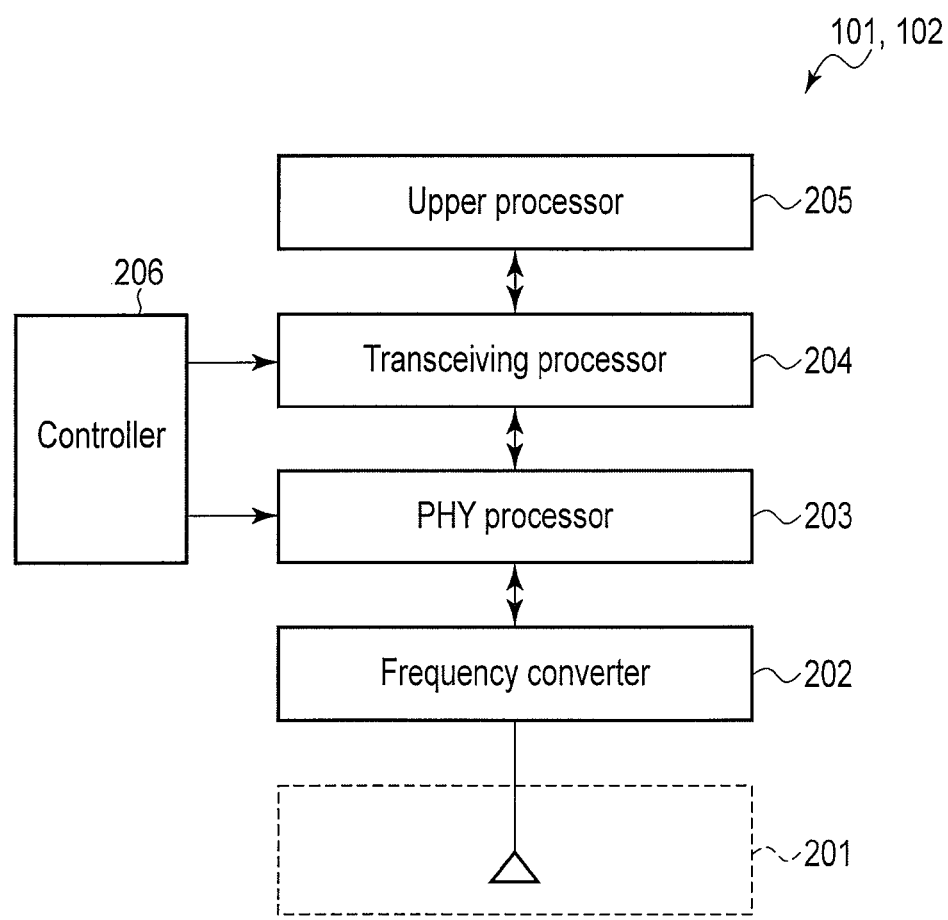
F I G. 2

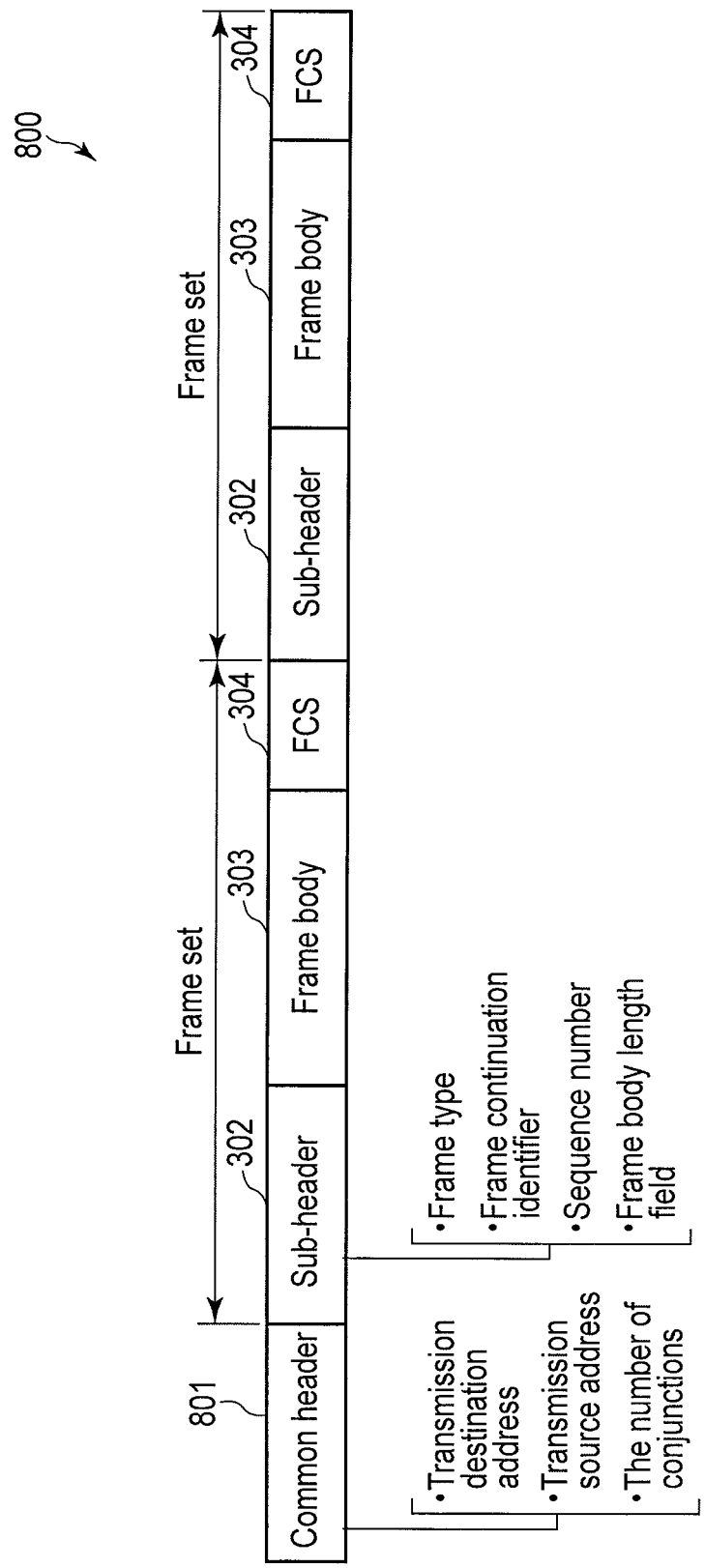
F I G. 8

WIRELESS COMMUNICATION APPARATUS AND METHOD

CROSS-REFERENCE TO RELATED APPLICATIONS

This application is based upon and claims the benefit of priority from Japanese Patent Application No. 2012-045732, filed Mar. 1, 2012, the entire contents of which are incorporated herein by reference.

FIELD

Embodiments described herein relate generally to a wireless communication apparatus and method.

BACKGROUND

In the past, a wireless communication apparatus has a method to determine a transmission cycle using information such as the traffic occurrence frequency of data. There is also a method to observe traffic of transmitted data and traffic of received data for a certain period of time, and select a power-saving mode suitable based on the traffic ratio thereof.

BRIEF DESCRIPTION OF THE DRAWINGS

FIG. 1 is a schematic view illustrating a point-to-point close proximity communication system according to the present embodiment;

FIG. 2 is a block diagram illustrating a wireless communication apparatus according to the first embodiment;

FIG. 8 is a figure illustrating an example of a data frame format when aggregation processing is applied;

DETAILED DESCRIPTION

Figure 3:
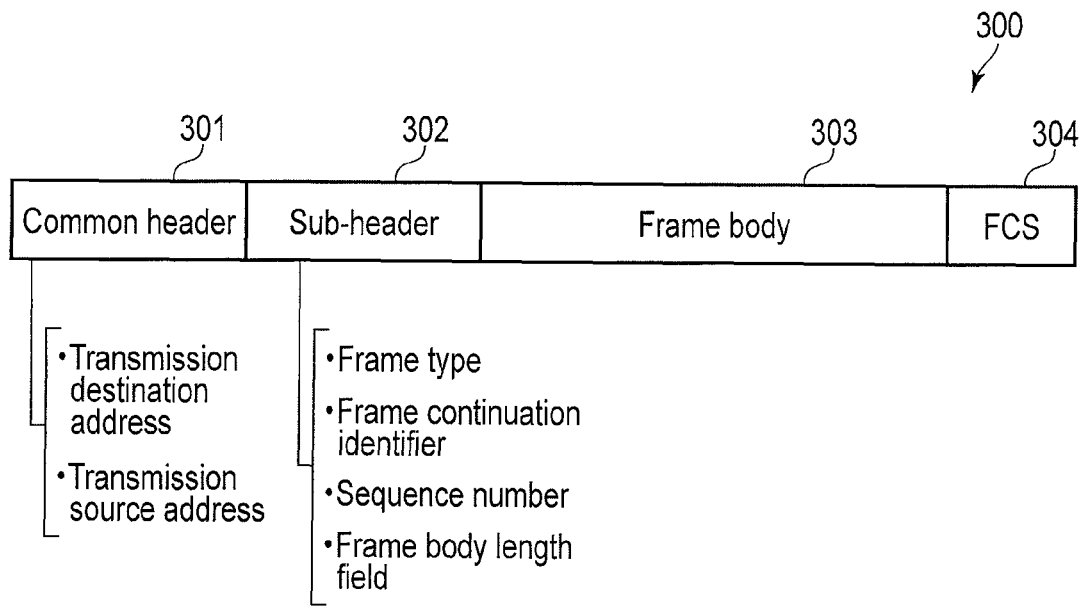
FIG. 3 is a figure illustrating an example of a data frame format.

Actual data are transmitted via a wireless medium to a transmission destination, but these conventional wireless communication apparatuses do not have any method to recognize whether a data transmission request is achieved or not based on the situation of the wireless medium, and do not have any method for controlling data transmission with both of the interval of the data transmission request and the transmission situation in the wireless medium being taken into consideration (or in view of them both).

In general, according to one embodiment, a wireless communication apparatus includes a first processor, a second processor and a controller. The first processor is configured to generate one or more first frames for transmitting a first data item if a first transmission request of the first data item is received from an upper layer, and generates one or more second frames for transmitting a second data item if a second transmission request of the second data item is received from the upper layer after the first transmission request is received from the upper layer. The second processor is configured to transmit the first frames and the second frames, and receive a first acknowledgement and a second acknowledgement, the first acknowledgement indicates whether or not the first frames are received and decoded, the second acknowledgement indicates whether or not the second frames are received and decoded. The controller is configured to retain a first interval relating to a time interval between the first transmission request and the second transmission request and a second interval relating to a time interval between a first time point and a second time point, and controls transmission of frames to be transmitted based on the first interval and the second interval, the first time point is a time point at which the first acknowledgement indicating that the first frames are received and decoded is received, the second time point is a time point at which the second acknowledgement indicating that the second frames are received and decoded is received.

Hereinafter, wireless communication apparatus and method according to embodiments of the present disclosure will be explained in detail with reference to drawings. In the embodiment below, portions denoted with the same numbers are considered to perform the same operations, and repeated explanation thereof is omitted.

(First Embodiment)

A schematic view illustrating a wireless communication system according to the present embodiment will be explained with reference to FIG. 1.

The wireless communication system 100 includes a wireless communication apparatus 101 and a wireless communication apparatus 102. In the example of FIG. 1, the wireless communication apparatus 102 exists within a communication range 151 of the wireless communication apparatus 101, and the wireless communication apparatus 101 exists within a communication range 152 of the wireless communication apparatus 102. Therefore, wireless communication can be performed between the wireless communication apparatus 101 and the wireless communication apparatus 102.

A procedure for establishing connection for performing wireless communication, i.e., a procedure for making communication setting, is a procedure for notifying information of each other in order to recognize the information of each other which is required to achieve wireless communication.

The information of each other is, for example, an identifier (IDentifier: ID) of a wireless communication apparatus, and when there are a plurality of versions as communication methods, a supported version number may also be included. Further, parameter information of an upper layer may also be included to be used for determination as to whether the other wireless communication apparatus is adopted as a communicating party or not in view of consistency in the upper layer above the wireless access protocol layer. In the present embodiment, data communication is performed between the wireless communication apparatus 101 and the wireless communication apparatus 102 after connection is established according to a desired connection procedure.

Subsequently, the wireless communication apparatus according to the first embodiment will be explained with reference to FIG. 2.

The wireless communication apparatus 101 according to the first embodiment includes an antenna 201, a frequency converter 202, a PHY (PHYsical) processor 203 (also referred to as a second processor), a transceiving processor 204 (also referred to as a first processor), an upper processor 205, and a controller 206. It should be noted that the wireless communication apparatus 102 has the same configuration as the wireless communication apparatus 101, and therefore, detailed description thereof is omitted.

The antenna 201 is connected to the frequency converter 202 explained later, and receives a radio signal from the outside or transmits a radio signal to the outside. The antenna may have a generally-available configuration such as a dipole antenna, a patch antenna, or a coupler antenna, and therefore, detailed description thereof is omitted. The wireless communication apparatus 101 according to the present embodiment includes the antenna 201, so that the wireless communication apparatus 101 can be made as one apparatus including the antenna 201, and this reduces the size of area of implementation. In addition, the antenna 201 is shared in transmission and reception, so that the sizes of the wireless communication apparatus 101 and the wireless communication apparatus 102 can be reduced. It should be noted that although, for example, one antenna 201 is shown here, a plurality of antennas 201 may also be provided.

In the transmission processing, the frequency converter 202 receives a physical packet from the PHY processor 203 explained later, and modulates the physical packet into a radio signal of a frequency band for transmission such as a radio signal in a 60 GHz millimeter-wave band, such as 60 GHz, or a radio signal in a microwave band, such as 2.4 GHz or 5 GHz. In the receiving processing, the frequency converter 202 receives a radio signal from the antenna 201, and demodulates the radio signal into a baseband signal that can be processed by the PHY processor 203.

In the transmission processing, the PHY processor 203 receives a frame and a transmission command from the transceiving processor 204 explained later, performs processing such as encoding to convert the frame into a physical packet, and transmits the physical packet via the frequency converter 202 and the antenna 201 to the wireless communication apparatus of the communicating party. In the receiving processing, the PHY processor 203 receives the baseband signal from the frequency converter 202, and performs physical packet decoding processing on the baseband signal and processing for removing a preamble, a physical header, and the like. The PHY processor 203 extracts a payload portion, on which the above processing has been performed, as a frame.

Before the PHY processor 203 gives the frame to the transceiving processor 204, the PHY processor 203 gives a notification signal for notifying start of reception of the physical packet to the transceiving processor 204. After the PHY processor 203 gives the frame to the transceiving processor 204, the PHY processor 203 gives a notification signal for notifying end of reception of the physical packet to the transceiving processor 204. Further, a notification of detecting the error of the physical packet and information about the state of the wireless medium are also input to the transceiving processor 204.

The transceiving processor 204 handles a data frame, a control frame, and a management frame used in the wireless communication system to establish a wireless link (connection) with another wireless communication apparatus, and to perform frame exchange thereof. More specifically, the transceiving processor 204 performs processing concerning Media Access Control (MAC). For the frame, the transceiving processor 204 may perform processing on the frame so as to control the frame transmission at the transmission side and sorting of data at the reception side so that the wireless communication apparatus exchanging data have the same order of data transmission and the same order of data reception in the application layer level.

More specifically, in a case of transmission processing, the transceiving processor 204 receives a transmission request of data including data from the upper processor 205 explained later (which may be hereinafter also referred to as a data transmission request), and generates one or more frames including the data. A single frame may be generated in response to a data transmission request, or a plurality of divided (fragemented) frames may be generated in response thereto. The transceiving processor 204 gives both of the generated frame and the transmission command to the PHY processor 203 with an appropriate transmission timing. At this point, the transceiving processor 204 may simultaneously perform commands of a modulation and a coding method necessary for the transmission. In the present embodiment, the generated frame is considered to be a frame to be subjected to retransmission processing, and after the frame has been transmitted, the transmission is determined to have failed unless an acknowledgment (ACK) frame in response to the transmitted frame starts to be received within a predetermined period of time, and in this case, this frame is retransmitted.

In a case of receiving processing, the transceiving processor 204 checks whether or not the frame satisfies a predetermined condition. When the frame is determined to satisfy the predetermined condition, an acknowledgement frame in response to the frame is generated, and after a fixed period of time elapses since the physical packet including the frame has been received, the acknowledgement frame is transmitted to the communicating party as a physical packet. In addition, the transceiving processor 204 sorts the received frame as necessary, and extracts data from each frame.

The frame can be checked as to whether the frame satisfies the predetermined condition as follows. When at least the transmission source address is an address of the wireless communication apparatus of the communicating party with which the wireless communication apparatus has established communication, and the transmission destination address (reception address) is the address of the wireless communication apparatus, the frame can be determined to be data satisfying the condition. The transmission source address and the transmission destination address are present in the header. In the present embodiment, the other conditions and the kind of contents that are included in the transmitted acknowledgment frame will be explained later with reference to FIGS. 3 and 4.

In the present embodiment, the transceiving processor 204 of the wireless communication apparatus 101 transmits a frame via the PHY processor 203, and receives an acknowledgement frame in response to the transmitted frame. Conversely, the transceiving processor 204 of the wireless communication apparatus 102 receives a frame via the PHY processor 203, and transmits an acknowledgement frame.

In a case of transmission processing, the upper processor 205 receives data, which are to be transmitted, from an application in accordance with a user's operation, and gives the data to the transceiving processor 204 as a data transmission request. In a case of receiving processing, the upper processor 205 receives data from the transceiving processor 204, and performs processing for such as inputting the data into an application.

The controller 206 retains an interval with which the transceiving processor 204 receives a data transmission request from the upper processor 205 and an interval with which the data transmission request is achieved. When data concerning the intervals are retained, a memory may be provided in the controller 206, and the data concerning the intervals may be retained in the memory. Alternatively, an external memory which can be read and written by the controller 206 may be provided, and data concerning intervals may be stored in the external memory. In the present embodiment, "data transmission request is achieved" means that the wireless communication apparatus at the transmission source recognizes that all of one or more frames generated based on the data transmission request have been received and decoded by the wireless communication apparatus at the transmission destination by looking up the acknowledgement frames, and retransmission of none of the frames is determined to be necessary. The details about the acquisition method of the interval with which the data transmission request is received and the interval with which the data transmission request is achieved will be explained later. The controller 206 controls the frame transmission based on the interval with which the data transmission request is received and the interval with which the data transmission request is achieved.

In this case, the wireless communication apparatus 101 according to the first embodiment includes each one of the PHY processor 203 and the transceiving processor 204. However the present embodiment is not limited thereto. A plurality of different PHY processors 203 may be provided, and the transceiving processors 204 corresponding thereto may be provided. Alternatively, a common processor may be provided to cover different PHY processors 203.

Subsequently, the frame types used in the wireless communication according to the present embodiment will be explained.

Frames handled by the wireless communication system 100 according to the present embodiment in terms of the wireless access protocol roughly include three types, i.e., a data frame, a management frame, and a control frame. These types are indicated by a header, which is usually provided in common among frames (a common header or a sub-header, explained later). The method for indicating the frame types may be by distinguishing the three types using one field or by distinguishing the three types using a combination of two fields.

The management frame is a frame used to manage a physical communication link between wireless communication apparatuses. Examples of management frames include frames used to set communication with another wireless communication apparatus, a frame for releasing a communication link (i.e., disconnecting connection), and frames concerning power save operation at the wireless communication apparatus.

The data frame is a frame that is used to transmit data generated in a wireless communication apparatus to another wireless communication apparatus after a physical communication link is established between wireless communication apparatuses.

The control frame is a frame used for control when the data frame is transmitted and received (exchanged) between the wireless communication apparatuses. An example of a control frame includes an acknowledgement frame transmitted for delivery confirmation when the wireless communication apparatus receives the data frame or the management frame.

As described above, the data frame is used to transmit data, and the control frame is used to perform control for data exchange. However, in addition, an element for managing a communication link such as a management frame may also be included in the data frame or the control frame. Usually, the common header is provided with an additional field, and therefore, for example, when an element for management is included in the field in the common header, the element can be notified to another wireless communication apparatus. More specifically, notification may be made of any of an interval with which a subsequent data frame is transmitted, a transition of the wireless communication apparatus into a sleep mode, and a transition to the sleep mode accompanying a time when complete recovery from the sleep mode to the normal operation is achieved. As described above, information for control concerning a communication link (i.e., control concerning data transmission) may be included.

Subsequently, a data frame format according to the present embodiment will be explained with reference to FIG. 3.

The data frame 300 includes a common header 301, a sub-header 302, a frame body 303, and an FCS (Frame Check Sequence) 304.

The common header 301 includes, for example, a transmission destination address and a transmission source address.

The sub-header 302 includes, for example, frame type, frame continuation identifier, sequence number, and frame body length fields. The frame body length field represents the length of the frame body 303 immediately after the sub-header 302.

The frame body 303 includes the main body of data to be transmitted and received.

The FCS 304 contains an error detection code for allowing the receiving side to detect whether information of the frame body 303 is correct or not. It should be noted that an error detection code may be also included in the common header 301 or in the sub-header 302.

Subsequently, an acknowledgement frame format according to the present embodiment will be explained with reference to FIG. 4.

The acknowledgement frame 400 includes a common header 401 and a sub-header 402. The common header 401 includes a transmission destination address and a transmission source address.

The sub-header 402 includes a frame type and a sequence number.

The sequence number included in the sub-header 402 is not a sequence number self-allocated by a cyclic counter like the data frame of FIG. 3, but is a number related to the delivery confirmation of the frame body 303 of the data frame transmitted. In this case, among the frame bodies 303 of the transmitted data frames that were able to be correctly received and decoded, the maximum sequence number of the corresponding sequence numbers that were able to be successively received is included in the sequence number field of the sub-header 402 and transmitted to the wireless communication apparatus at the data transmission side.

Subsequently, fragmentation and defragmentation of the wireless communication apparatus according to the present embodiment will be explained.

In the transceiving processor 204, the maximum frame body length is set in order to limit the frame body length of the data frame. It should be noted that the frame body length may be set by preparing a memory that could be looked up by the transceiving processor 204, and causing the memory to retain information about the maximum frame body length.

When the size of data included in the data transmission request is more than the maximum frame body length, a plurality of data frames obtained by dividing the data with the maximum frame body length are generated. This is called fragmentation or segment processing. For example, when the data size is 1200 M bytes and the maximum frame body length is 500 M bytes, the transceiving processor 204 cuts out 500 M bytes of data from the head of the data. The transceiving processor 204 generates the first data frame in such a manner that the cut-out data is included in the frame body. Subsequently, the transceiving processor 204 cuts out 500 M bytes of data from the head of the remaining data, thereby generating the second data frame in such a manner that the cut-out data are included in the frame body. Finally, the transceiving processor 204 generates the third data frame which includes the remaining 200 M bytes of data in the frame body.

In each of the first data frame and the second data frame, there is another data frame generated from the same data following each of them, and therefore the frame continuation identifier of the header is used to indicate that they are from the same data. This frame continuation identifier may indicate whether the data frames of the same data continue or not, and accordingly, one bit may be prepared to represent the above using either "1" or "0". For example, in the first data frame and the second data frame, the data frames of the same data continue, and therefore, the frame continuation identifier is set to "1". This frame continuation identifier corresponds to a bit indicated as a More Fragment in, for example, IEEE802.11 wireless LAN. Since the third data frame is the final data frame of the same data, the frame continuation identifier is set to "0" in the third data frame.

In each data frame, the sequence number indicating the order of transmission is included in the header. When the sequence number of the first data frame is, for example, 1, the sequence numbers of the second and third data frames are denoted as 2 and 3, respectively.

Even when another data transmission request is received by the transceiving processor 204, and a new data frame is transmitted in response to the data transmission request, a sequence number is sequentially attached continuing from the previous third data frame. More specifically, the sequence number of the first data frame of the other data transmission request starts from 4. In general, a sequence number is generated by a cyclic counter, and when the value of the sequence number reaches the maximum value of the cyclic counter, the next sequence number goes back to the initial value of the cyclic counter.

On the other hand, the wireless communication apparatus 102 having received the data frame having been subjected to the fragmentation can use the frame continuation identifier and the sequence number explained above to restore data passed to the upper processor 205. The data frames are sorted based on the sequence number, and the frame body in a data frame of which frame continuation identifier is "1" is aggregated with the frame body of the data frame of a subsequent sequence number. The frame body is repeatedly aggregated until a data frame of which frame continuation identifier is "0" is aggregated. Data obtained by aggregating the frame bodies of the data frames including the one of which frame continuation identifier is "0" are passed to the upper processor 205. When data frames having continuous sequence numbers of which frame continuation identifiers are "0" are obtained, each of the data frames are passed to the upper processor 205 in order with each frame body being a single piece of data.

In the above explanation, the method for applying the sequence number independently from the fragmentation has been explained. Alternatively, a method may be employed to attach the same sequence number to data frames within the same data transmission request, and attach numbers respectively identifying the data frames (i.e., fragment numbers). In this case, the sequence number of the first to third data frames is, for example, 1, but the fragment numbers of the first to third data frames are set to 0 (zero) (the initial value of the fragment number), 1, 2, respectively. Like the above case, the frame continuation identifiers of the first and second data frames are set to "1", and the frame continuation identifier of the third data frame is set to "0".

The wireless communication apparatus 102 at the data frame reception side collects data frames having the same sequence number and sorts the data frames in the order of the fragment number, and aggregates, in the order of the fragment number, all the frame bodies including the data frame of which frame continuation identifier is "0". Thereafter, the aggregated frame bodies can be passed, as data, to the upper processor 205 in the order of the sequence numbers. When a data frame of which fragment number is "0" and of which frame continuation identifier is "0" is received, it can be determined that the fragmentation is not performed for the sequence number of such data frame, and the data frame can be passed, as a single piece of data, to the upper processor 205 based on the order of the sequence numbers.

Subsequently, the relationship between a sequence number and retransmission processing of data will be explained.

In this case, it is assumed that a starting sequence number starting sequence number of a data frame transmitted from the wireless communication apparatus 101 is already known by the wireless communication apparatus 102. Examples of methods for recognizing a starting sequence number include a method for notifying the starting sequence number in a management frame in the connection process, and a method for notifying that a sequence number used in a data frame transmitted first is the starting sequence number. Here, a case where the starting sequence number is "10" is considered for example.

The wireless communication apparatus 101 transmits the first data frame with a sequence number "10". When the wireless communication apparatus 102 correctly receives and decodes the frame body of the first data frame, the wireless communication apparatus 102 transmits an acknowledgement frame having "10" written to the sequence number field to the wireless communication apparatus 101 after, for example, the minimum frame interval elapses since the reception of the first data frame has been completed.

Subsequently, the wireless communication apparatus 101 transmits the second data frame with a sequence number "11". It is assumed, however, that the wireless communication apparatus 102 is able to receive the common header and the sub-header of the second data frame, but fails to correctly decode the frame body by the decision based on the FCS. In this case, after the minimum frame interval elapses since the end of the second data frame has been completed, the wireless communication apparatus 102 transmits an acknowledgement frame having "10" written to the sequence number field again to the wireless communication apparatus 101.

When the wireless communication apparatus 101 receives the acknowledgement frame having "10" in the sequence number field, the wireless communication apparatus 101 retransmits the second data frame of which sequence number is "11". Even when the wireless communication apparatus 101 transmits the second data frame having the sequence number 11 and waits for a fixed period of time to determine whether an acknowledgement frame is received or not and thereafter determines that no acknowledgement frame is received, the wireless communication apparatus 101 retransmits the second data frame of which sequence number is "11". More specifically, the wireless communication apparatus 101 transmits data frames so that the wireless communication apparatus 102 is able to securely receive data frames in order of the sequence numbers.

Subsequently, a method for calculating the interval with which the data transmission request is received and the interval with which the data transmission request is achieved will be explained with reference to FIG. 5.

Figure 5:
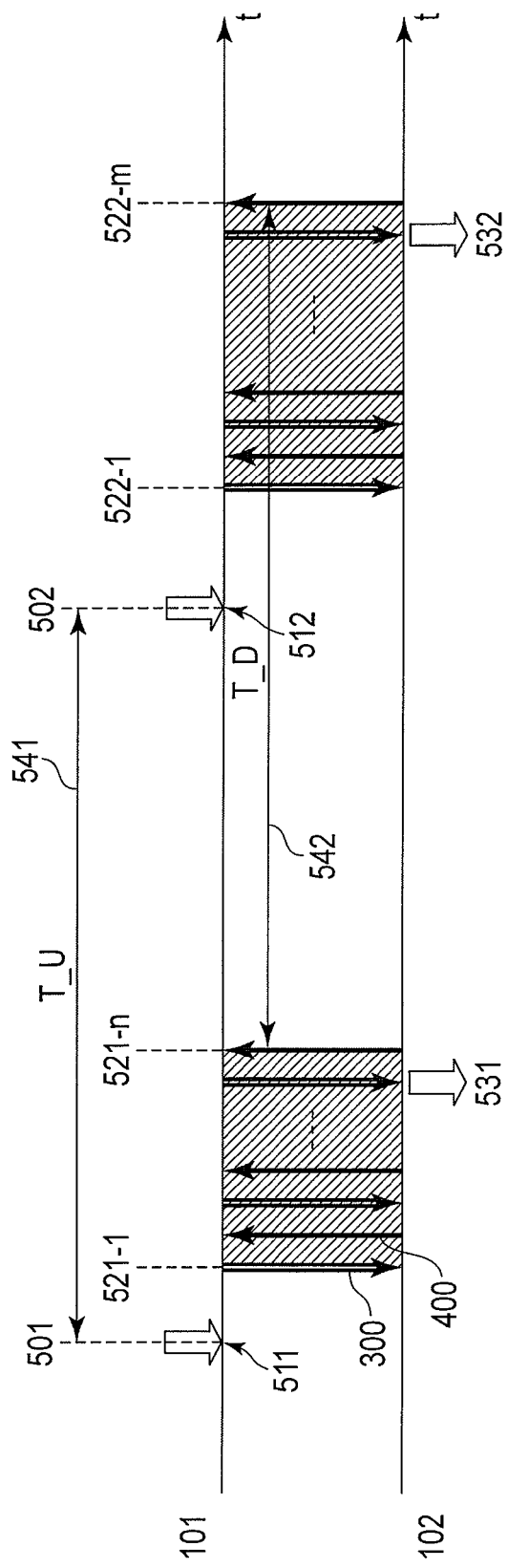
FIG. 5 is a figure illustrating an example of data frame exchange between the wireless communication apparatuses according to the first embodiment.

The sequence of the wireless communication apparatus as shown in FIG. 5 represents, in order of time, data frame exchange between the wireless communication apparatus 101 and the wireless communication apparatus 102. FIG. 5 shows operation in a case where data are transmitted from the wireless communication apparatus 101 shown in the upper side of the time axis to the wireless communication apparatus 102 shown in the lower side of the time axis.

The transceiving processor 204 of the wireless communication apparatus 101 receives a data transmission request 501 from the upper processor 205, and converts data included in the data transmission request 501 into a data frame or data frames. When the data are converted into the data frames, the data are divided in units of fixed length if the size of the data is longer than a fixed length. In the example of FIG. 5, n data frames (n is a natural number equal to or more than 2) are generated.

Each divided data are included in a frame body of a data frame, and a time point 521-1 represents a time point at which the first data frame is initially accessed to the wireless medium via the PHY processor 203. A time point 521-n represents a time point at which a delivery confirmation in response to the last data frame (the n-th data frame) is received from the wireless communication apparatus 102, i.e., the communicating party. It should be noted that when the data transmission request 501 is converted into only one data frame, the time point 521-n is a time point at which a delivery confirmation in response to the data frame is received from the communicating party. More specifically, the wireless communication apparatus 101 can confirm, based on the acknowledgement frame received at the time point 521-n, as to whether the wireless communication apparatus 102, i.e., the communicating party, has received and decoded all of one or more data frames generated based on the data transmission request 501, and can determine that retransmission is unnecessary.

In the wireless communication apparatus 101, a time point at which the above confirmation and determination are actually made is after the time point 521-n, but, for example, when the following method is used, the upper layer of the wireless communication apparatus 101 can recognize that the wireless communication apparatus 102 has received all the data frames.

In the wireless communication apparatus 101, the PHY processor 203 notifies a reception end time point of a frame to the transceiving processor 204, and the transceiving processor 204 receives and retains the reception end time point of the frame thus notified. Thereafter, when a frame which is to be confirmed and determined satisfies a condition, the retained reception end time point of the frame may be adopted as a time point 521-n. Alternatively, the transceiving processor 204 may retain a timer, or may be configured to look up an external timer, so that instead of strictly recognizing the reception end time point of the frame, a time point at which the confirmation and determination are made to find that the frame satisfies the condition may be adopted as a time point 521-n. It should be noted that the transceiving processor 204 may perform retransmission processing between the time point 521-1 and the time point 521-n.

Subsequently, when the wireless communication apparatus 101 receives the data transmission request 502 at the time point 512 from the upper processor 205, the transceiving processor 204 generates data frames by dividing data included in the data transmission request 502 into m pieces. With the same frame exchange as the data transmission request 501, a time point 522-1 is a time point of the initial access of the first data frame concerning the data transmission request 502, and a time point 522-m is a time point at which an acknowledgement in response to the last data frame is received.

After the above processing, the transceiving processor 204 retains time points at which data transmission requests are received from the upper processor 205, i.e., a time point 511 and a time point 512. A time interval of difference between the time point 511 and the time point 512 is obtained as an interval T_U 541 (first interval) which is an interval with which data transmission requests are received. It should be noted that the interval T_U 541 may be obtained by performing statistic processing over a plurality of data transmission requests such as an average or intermediate value of the interval of the data transmission requests.

Likewise, the transceiving processor 204 retains an interval of the time point 521-n and the time point 522-m which are time points at which all the acknowledgements for the first data frame to the last data frame concerning the respective data transmission requests are received. A difference between the time point 521-n and the time point 522-m is obtained as an interval T_D 542 (second interval) which is an interval with which the data transmission request is achieved. It should be noted that the interval T_D 542 may be obtained by performing statistic processing over a plurality of data transmission requests. As described above, the interval T_U 541 and the interval T_D 542 can be calculated.

It should be noted that the values of the interval T_U 541 and the interval T_D 542 may be constantly updated based on transmission of subsequent data frames. For example, in the example of FIG. 5, a subsequent data transmission request 503 (not shown) is received from the upper processor 205. In this case, a difference between the time point 512 and the time point 513 at which the data transmission request 503 is received may be updated as a new interval T_U. When a time point 523-p is obtained at which all the acknowledgements for the first data frame to the last data frame concerning the data transmission request 503 are received, the difference between the time point 523-p and the time point 522-m may be updated as a new interval T_D.

On the other hand, when the wireless communication apparatus 102 correctly receives a data frame, the wireless communication apparatus 102 extracts the frame body, and when there are a plurality of data frames concerning the same data, the frame bodies are aggregated (reassembled). This processing is called defragmentation or reassembling processing. When all the data frames concerning the data are correctly received, and the frame bodies of the data frames concerning the same data have been aggregated, the ultimate data (data 531 and data 532 in FIG. 5) are obtained, and the data are given to the upper processor 205 of the wireless communication apparatus 102.

Subsequently, the details of the method for calculating the interval T_D will be explained.

When the data frames are generated, the transceiving processor 204 of the wireless communication apparatus 101 retains, for example, sequence numbers of which frame continuation identifier is "0". It is preferable to retain a plurality of corresponding sequence numbers. For example, it is preferable to retain at least two or more corresponding sequence numbers.

Then, when the transceiving processor 204 receives an acknowledgement frame, and when the sequence number of the acknowledgement frame is determined to be the same as the retained sequence number, the reception completion time point of the acknowledgement frame may be adopted as a time point at which an acknowledgement in response to the last data frame concerning the data transmission request is received. More specifically, the time point 521-n is the time point at which the data transmission request 501 is achieved. After the time point at which the acknowledgement is received is determined, the retained sequence number is deleted, and therefore the load of the memory can be reduced.

As described above, by obtaining the interval T_U and the interval T_D, the balance of the delivery situation of the data transmission requests via the wireless medium can be checked. For example, when the lengths of the intervals satisfy T_U<T_D, i.e., when the interval T_D is longer than interval T_U, this indicates that data frame transmission concerning the data transmission request to the wireless communication apparatus 102 is not performing very well due to, e.g., retransmission. On the other hand, when the lengths of the intervals satisfy T_U=T_D, i.e., when the interval T_U is equal to the interval T_D, this indicates the state that the data frames concerning the data transmission request are transmitted to the wireless communication apparatus 102 with preferable balance. In the present embodiment, when the difference between the interval T_U and the interval T_D is less than the difference of the degrees in accuracy when the statistical quantities of the interval T_U and the interval T_D are calculated, the lengths of the intervals may be treated as the same value.

The controller 206 controls the transmission interval of data frames scheduled to be thereafter transmitted (frames scheduled to be transmitted) based on the interval T_U and the interval T_D. An example of a method for controlling the data transmission using the interval T_U and the interval T_D includes a method for controlling the wireless communication apparatus 101 so that the wireless communication apparatus 101 goes into a sleep mode in which functions other than minimum functions are put into the sleep state when the interval T_U is the same as the interval T_D and the value thereof is equal to or more than a threshold value. In this case, the sleep state means stopping or limiting electric power supplied to some of the circuits by cutting off the power, for example. The sleep mode means a state in which the power supply is stopped or limited. Conversely, the normal operation mode is not the sleep mode but means the state in which electric power is supplied to all the circuits.

More specifically, the controller 206 determines the time length of the sleep state, and the determined sleep time length is set as a timer. After transmission of a subsequent data frame, a part of the wireless communication apparatus 101, e.g., the PHY processor 203 is caused to be in the sleep state, and the timer starts to count down. Thereafter, when the timer finishes counting down, the portion of the circuit which was changed to the sleep mode is changed back to the normal operation mode (a state in which electric power is supplied to all the circuit).

An example of a threshold value includes a summation of a transmission/reception switching time, a receiving time of an acknowledgement frame, a transition time to the sleep mode, a recovery time back to the normal operation mode, and the minimum time required to access the wireless medium.

In addition, the wireless communication apparatus 101 notifies the wireless communication apparatus 102 of information about an interval from when a transmitted data frame or an acknowledgement frame is transmitted to when a subsequent data frame is transmitted or notifies change to the sleep mode and a time required to return back to the normal operation mode. By doing so, the transmission interval can be shared with the wireless communication apparatus 102 of the communicating party and the data transmission can be controlled efficiently, and in accordance with the timing of the sleep control, the two wireless communication apparatuses can efficiently save energy. Further, information about the transmission interval or the time required to return back from the sleep mode may be notified to each other, or in response to a notification given by one of them, the other of them may indicate whether the notification has been accepted or not. By doing so, the two wireless communication apparatuses can negotiate the control time and start timing with each other.

Further, the sleep mode may be adjusted in view of the difference of a plurality of values of the interval T_D calculated in the past. More specifically, when a variance of the value of the interval T_D is also calculated, it may be considered as follows. As the variance of the interval T_D gets larger, there is a larger margin for adjusting and increasing the time length of the sleep mode. Therefore, when the variance of the value of the interval T_D is equal to or more than a threshold value, and the interval T_U is equal to the interval T_D, the value of T_U may be set at a value longer than a fixed period of time, and a state in which there is a longer period of time in the sleep mode may be tried. As a result, when the interval T_U is the same as the interval T_D, there is no problem in the time period in the sleep mode, and it may be possible to try to further increase it by the length of the fixed period of time. On the other hand, when the interval T_D is longer than interval T_U, it is considered that the time in the sleep mode is too long, where transmission and reception is not going smoothly, and therefore, the time period in the sleeping mode may be returned back to a previous choice.

The above explanation relates to use of the control of the sleep mode. In addition, in order to control the transmission rate or the modulation and Coding Scheme (MCS) of data frames, a relationship between the interval T_U and the interval T_D may be used. For example, when the interval T_U is equal to the interval T_D, control may be performed to increase the transmission rate or the MCS. Alternatively, the maximum frame body length may be adjusted. For example, when the interval T_U is equal to the interval T_D, the maximum frame body length is increased. When the polling method is employed, a polling cycle may be adjusted in view of the relationship between the interval T_U and the interval T_D. For example, when requesting the wireless communication apparatus of the communicating party to follow a polling cycle, the polling cycle is requested as follows. When the interval T_D is longer than interval T_U, a shorter polling cycle than the current polling cycle is requested, and when the interval T_U is equal to the interval T_D, the current value may be maintained.

As described above, the transceiving processor 204 can recognize that all the acknowledgement frames up to the one for the last data frame concerning the respective data transmission requests have been received, and therefore, a response of processing completion of each data transmission request can be returned to the upper processor 205.

For example, when the IEEE802.11 wireless LAN standard is considered to be used as a wireless communication method, the transceiving processor 204 is a portion for performing processing corresponding to the MAC layer. In that case, the controller 206 performs retransmission processing by means of the transceiving processor 204, but there may be cases as a result of a certain number of retransmissions, when a relevant retry limit is reached, or as a result of retransmissions for a certain period of time, when a timeout of a relevant timer occurs, and then, retransmission ceases, and the data transmission request received from the upper processor 205 is discarded.

For this issue, if, like the present embodiment, the transceiving processor 204 can recognize that all the acknowledgement frames up to the one for the last data frame concerning the respective data transmission requests have been received, it is possible to give responses of each of the processing results in response to each of the data transmission requests given by the upper processor 205. In more detail, the processing is as follows. When the transceiving processor 204 suspends operation concerning a data transmission request due to a retry counter reaching a limit of a timeout of a timer occurring, the transceiving processor 204 gives a response indicating that the processing in response to the data transmission request given by the upper processor 205 is incomplete. When all the acknowledgement frames up to the one for the last data frame concerning the data transmission requests have been received, the transceiving processor 204 gives responses each indicating the processing completion of each of the data transmission requests to the upper processor 205. Accordingly, the retransmission control of the upper processor 205 can be made more efficient by using the responses to the data transmission requests given by the transceiving processor 204. For example, the upper processor 205 can expect that the response to the data transmission request is surely given by the transceiving processor 204, and therefore, when a response indicating that the data transmission request is completed is given, it is determined that data transmission request need not be retransmitted. When the transceiving processor 204 gives a response indicating that the data transmission request is incomplete, it can be determined to give the data transmission request to the transceiving processor 204 again. Also, determination of processing in an upper level such as termination, suspension, restart, or resume of an application can be done promptly.

According to the first embodiment explained above, the wireless communication apparatus at the data transmission side receives the acknowledgement frame in response to the respective data frames, so that the wireless communication apparatus at the data transmission side can recognize whether the data transmission requests have been achieved or not. Therefore, the data transmission can be controlled in view of the situation of the wireless medium.

(Second Embodiment)

As shown in the first embodiment, in the method for averaging the intervals of the transmission completions in units of data transmission requests, when the adjustment of the cycle of the sleep mode or the polling is considered, the cycle may become shorter than in the ideal operation of the wireless communication apparatus, and the efficiency of the data transmission may be reduced. Accordingly, in the second embodiment, the data transmission requests are burst-transmitted, and the interval between bursts is recognized. By doing so, the data transmission can be efficiently controlled while maintaining the interval during an ideal operation of the wireless communication apparatus.

In this case, a plurality of data transmission requests are treated as one data transmission request, and the burst represents a unit in which a time point at which the data transmission request is achieved is recognized.

A first method in which a plurality of data transmission requests are treated as one data transmission request will be explained. There is a method in which, if the transceiving processor 204 retains a sequence number corresponding to a subsequent data transmission request (hereinafter referred to as a second request for the sake of convenience) before recognizing a data transmission request (hereinafter referred to as a first request for the sake of convenience) is achieved, transmission of data frames concerning the second request is treated as transmission within the same burst as transmission of data frames concerning the first request. In such case, a sequence number retained in the transceiving processor 204 (hereinafter referred to as a retained sequence number) is updated with a subsequent retained sequence number.

More specifically, when completion of the first request is recognized, the retained sequence number corresponding to the first request is usually deleted in the first embodiment. However, in the second embodiment, when the transceiving processor 204 retains the sequence number corresponding to the second request before the retained sequence number corresponding to the first request is deleted, the retained sequence number is updated with a subsequent retained sequence number. Based on this new updated retained sequence number, the time point of the transmission completion is recognized, as in the first embodiment.

Data frame exchange between wireless communication apparatuses according to the second embodiment will be explained with reference to FIG. 6.

This shows operation in a case where data are burst-transmitted from the wireless communication apparatus 101 shown in the upper side of the time axis to the wireless communication apparatus 102 shown in the lower side of the time axis.

Figure 6:
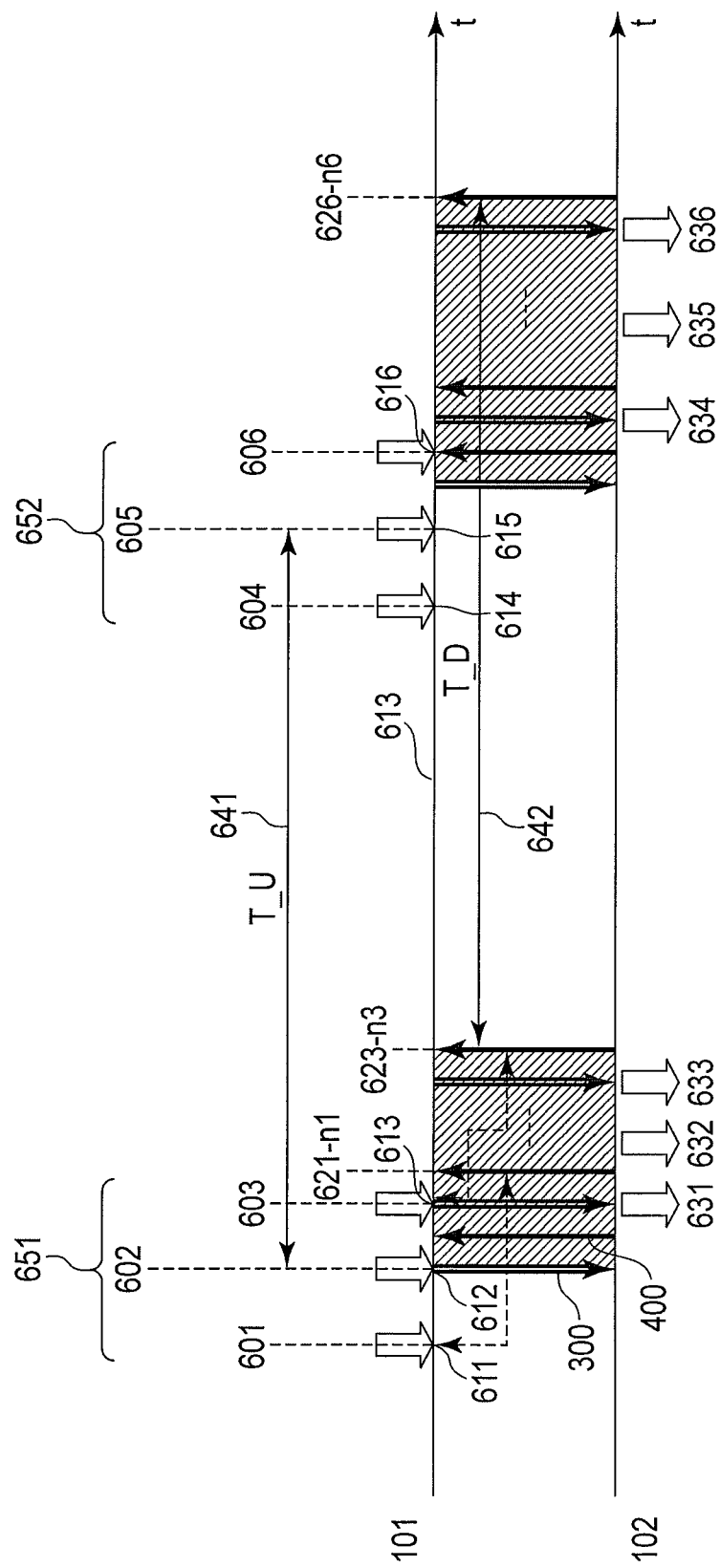
FIG. 6 is a figure illustrating an example of data frame exchange between wireless communication apparatuses according to the second embodiment.

In FIG. 6, the transceiving processor 204 of the wireless communication apparatus 101 receives a data transmission request 601 from the upper processor 205, generates one or more corresponding data frames, and starts preparing transmission to a wireless medium. The sequence number of the last data frame, or when only one data frame is generated, the sequence number of the corresponding data frame is retained at the transceiving processor 204. The transceiving processor 204 receives a subsequent data transmission request 602, and likewise generates corresponding data frames.

At this occasion, the transceiving processor 204 extracts the sequence number of the last data frame concerning the subsequent data transmission request 602 to be retained, or, when only one data frame is generated, the sequence number of the corresponding data frame, and the sequence number concerning the data transmission request 601 previously retained is rewritten with the sequence number concerning the subsequent data transmission request 602, and is retained. As a result of rewriting, the retained sequence number retained to be referenced and compared with the sequence number described in the received acknowledgement frame becomes the sequence number concerning the subsequent data transmission request 602.

Likewise, the transceiving processor 204 receives a subsequent data transmission request 603, and turns out to recognize that a time point at which an acknowledgement frame notifying the same sequence number as the retained sequence number concerning the data transmission request 603 is received is a completion time point of the burst transmission of the data transmission requests 651. In the example of FIG. 6, the time point at which the transmission completion of the burst transmission 651 is recognized is a time point 623-n3. The retained sequence number concerning the data transmission request 603 is deleted from the transceiving processor 204 when the acknowledgement frame notifying the same sequence number is determined to have been received.

Then, a sequence number concerning a data transmission request 604 is retained in the transceiving processor 204, and similar processing is performed. More specifically, the sequence number concerning the data transmission request 604 is rewritten with a sequence number concerning a data transmission request 605, and further rewritten with a sequence number concerning a data transmission request 606. At this occasion, a time point at which an acknowledgement frame notifying the same sequence number as the retained sequence number is received is a time point 626-n6. Therefore, a time point at which transmission completion of the burst transmission 652 is recognized is a time point 626-n6. Ultimately, the controller 206 calculates a difference between the time point 623-n3 and the time point 626-n6, and hereinafter, statistically processes time intervals obtained continuously according to the same method, thus obtaining an interval T_D 642.

On the other hand, the interval T_U 641 of the data transmission request can be obtained as follows. The transceiving processor 204 retains a time point at which the data transmission request corresponding to the retained sequence number is received, and the interval T_U 641 can be obtained from the interval of the time point at which the data transmission request corresponding to the last used retained sequence number is received.

A first alternative method for updating the retained sequence number with a subsequent retained sequence number is as follows. If a sequence number corresponding to the second request is also retained before the minimum access time completion for each apparatus after completion of the first request is recognized, the data frames concerning the second request are also transmitted within the same burst as the data frames concerning the first request. In such case, the retained sequence number can be updated with a subsequent retained sequence number.

In this case, the transceiving processor 204 confirms completion of the data transmission request 601 with the corresponding acknowledgement frame reception, and thereafter observes the state of the wireless medium by means of the PHY processor 203. At this occasion, when a time in which the wireless medium is in the idle state passes a time obtained by subtracting a processing delay of transmission/reception switching for transmission from the minimum access time, a confirmation is made as to whether a sequence number corresponding to a subsequent data transmission request 602 is retained or not. At this stage, when the sequence number corresponding to the subsequent data transmission request 602 is held in the transceiving processor 204, the sequence number retained corresponding to the data transmission request 601 is updated with the sequence number corresponding to the subsequent data transmission request 602. With this update the transmission/reception is switched, and after the minimum access time elapses, the transmission of the data frames concerning the subsequent data transmission request 602 is continued as the transmission within the same burst as the data frames concerning the data transmission request 601.

The transceiving processor 204 confirms, based on the reception of the corresponding acknowledgement frame, as to whether the data transmission request 601 is completed or not. Thereafter, the transceiving processor 204 observes the state of the wireless medium by means of the PHY processor 203. At this occasion, before a time obtained by subtracting a processing delay of transmission/reception switching from the minimum access time elapses, it is assumed that the transceiving processor 204 recognizes interruption of the idle state of the wireless medium (i.e., the wireless medium becomes busy). In this case, the transceiving processor 204 deletes the sequence number corresponding to the data transmission request 601, and obtains a time point 621-n1 at which completion of the data transmission request 601 is recognized. Thereafter, the wireless communication apparatus 101 waits until the wireless medium changes to the idle state again, but processing concerning the subsequent data transmission request 602 is treated as another transmission burst. As a result, a time point at which an acknowledgement frame describing the same sequence number as the sequence number retained for the data transmission request 602 in a corresponding manner is received is obtained as a time point 622-n2, and a difference of the time interval between the time point 622-n2 and the time point 621-n1 is used for calculation of T_D.

Further, a second alternative method for updating the retained sequence number with a subsequent retained sequence number will be explained.

When a data frame corresponding to the second request is prepared before completion of the minimum access time after the achievement of the first request is recognized (i.e., after the reception of the corresponding acknowledgement frame), transmissions of respective data frames concerning the first request and the second request are treated as transmissions within the same burst. Then, without recognizing the transmission completion based on the retained sequence number corresponding to the first request, the transmission completion of the burst transmission is recognized using the retained sequence number corresponding to the second request.

In this case, when the transceiving processor 204 confirms the achievement of the first request, based on the reception of the corresponding acknowledgement frame, the transceiving processor 204 observes the state of the wireless medium for a certain period of time by means of the PHY processor 203. Then, when a time obtained by subtracting a processing delay of transmission/reception switching from the minimum access time elapses, the transceiving processor 204 confirms whether a data frame corresponding to the second request is generated.

More specifically, when a data frame corresponding to the data transmission request 602 subsequent to the data transmission request 601 is generated, recognition of transmission completion with the retained sequence number corresponding to the data transmission request 601 is held in abeyance. The wireless communication apparatus obtains an access right to the wireless medium, and thereafter transmission of data frames concerning the subsequent data transmission request 602 is continued. The transceiving processor 204 retains the retained sequence number corresponding to the subsequent data transmission request 602, and recognizes transmission completion using the new retained sequence. If no data frame corresponding to the subsequent data transmission request 602 is generated, transmission completion is recognized using the retained sequence number corresponding to the data transmission request 601 when the time obtained by subtracting processing delay of transmission/reception switching from the minimum access time elapses. Thereafter, for the data transmission request 602, the same processing as what has been described above is performed as another transmission burst.

Alternatively, if the transceiving processor 204 retains the sequence number corresponding to a subsequent data transmission request when retransmission of a data frame occurs, the retained sequence number can be updated with the subsequent retained sequence number. In this case, if the sequence number concerning the subsequent data transmission request 602 is retained at the time point at which retransmission of a data frame is determined, the retained sequence number is updated with the subsequent sequence number.

It should be noted that, in the wireless communication apparatus 102, the final data as in FIG. 5 are generated, and data 631 to data 636 are given to the upper processor 205 in the order of generation.

Hereinafter, the calculation example of the interval T_U and the interval T_D according to the second embodiment will be explained with reference to FIG. 7A to FIG. 7D.

FIGS. 7A to 7D are examples showing reception of a data transmission request as shown in FIG. 6, and retaining and updating method of parameters in the transceiving processor 204 where data frames and acknowledgement frames are exchanged between the wireless communication apparatuses 101 and 102. In the second embodiment, a main region 751 and an auxiliary region 752 are included as a storage region of the transceiving processor 204.

In step S701, first, when the data transmission request 601 is received at a time point 611, the time point 611 is written to a write region corresponding to an accepting time point t_acpt of the data transmission request in the main region 751. Thereafter, data frames concerning the data transmission request 601 are generated, and it is considered that the sequence number of the data frame of which frame continuation identifier is "0" (i.e., the last data frame of the data transmission request 601) is "12". This sequence number "12" is written to a write region, track SN, prepared to hold the retained sequence number corresponding to the time point 611. For the sake of convenience, a sequence number compared with the sequence number of the acknowledgement frame is referred to as a track sequence number.

In step S702, when the data transmission request 602 is received at a time point 612, the time point 612 is written to a write region corresponding to an accepting time point t_acpt of the data transmission request in the auxiliary region 752. Thereafter, data frames concerning the data transmission request 602 are generated, including the data frame of which frame continuation identifier is "0", and the sequence number of the data frame of which frame continuation identifier is "0" is written to a region, track SN, prepared to hold the retained sequence number corresponding to 612 written in the auxiliary region 752. In this case, it is assumed that the sequence number of the data frame of which frame continuation identifier is "0" concerning the data transmission request 602 is "15", and "15" is written to the track SN column.

In step S703, any one of the above determination methods is used to update the retained sequence number. More specifically, when the data transmission request 602 is determined to be transmitted in the same burst as the data transmission request 601, a portion retaining information corresponding to the data transmission request 601 in the main region 751 is rewritten with information concerning the data transmission request 602. More specifically, in the example of FIG. 7A, the value of t_acpt is rewritten from 611 to 612, and the value of track SN is rewritten from 12 to 15. At this occasion, information concerning the data transmission request 602 of the auxiliary region 752 is unnecessary, and therefore, it is preferable to delete or enable to overwrite the columns and improve the efficiency of memory usage.

When, without using the auxiliary region 752, the data transmission request 602 can be determined to be transmitted in the same burst as the data transmission request 601 when the data transmission request 602 is received, a portion retaining information corresponding to the data transmission request 601 in the main region 751 may be directly rewritten with information concerning the data transmission request 602.

In step S704, when the data transmission request 603 is received at the time point 613, an accepting time point 613 and the sequence number of the last data frame (in this case, 17) are retained to the auxiliary region 752 like the above.

In step S705, this data transmission request 603 is transmitted in the same burst as the data transmission request 602 and the data transmission request 601 which is further before the data transmission request 602, and therefore, a portion retaining information corresponding to the data transmission request 602 in the main region 751 is rewritten with information concerning the data transmission request 603. More specifically, the value of t_acpt is rewritten from 612 to 613, and the value of track SN is rewritten from 15 to 17.

Figure 7A:
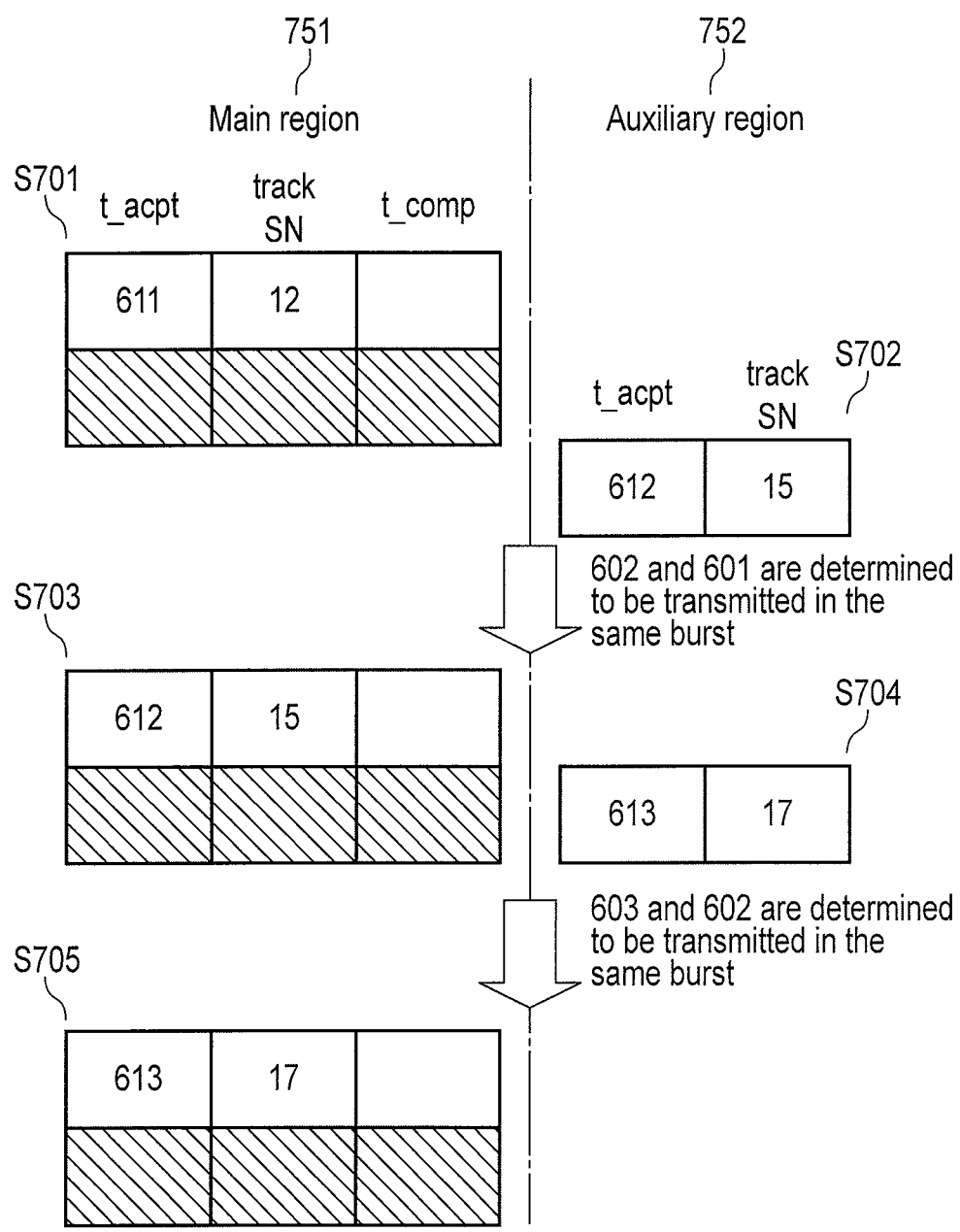
FIG. 7A is a sequence diagram illustrating a calculation example of T_U and T_D according to the second embodiment.
Figure 7B:
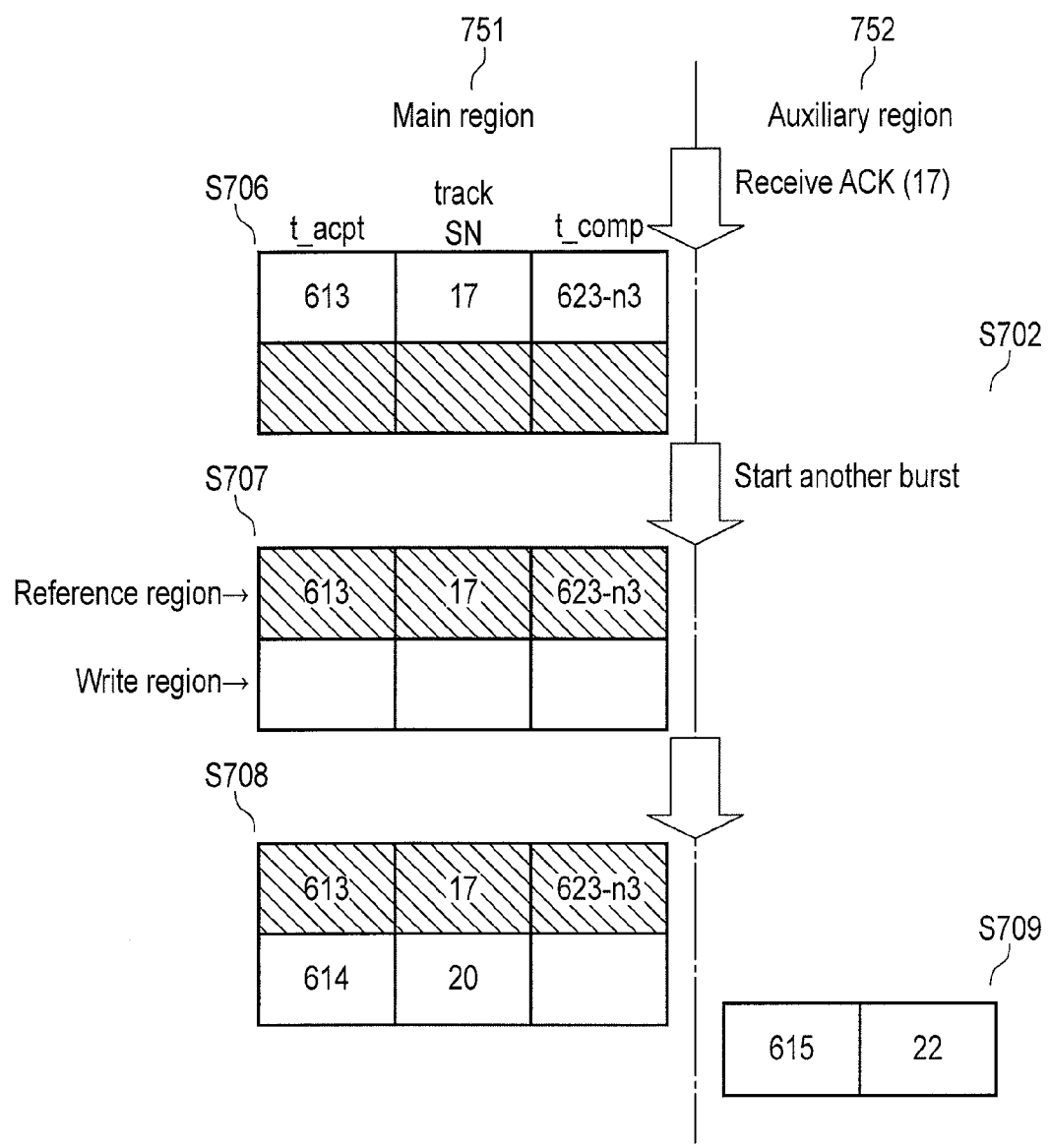
FIG. 7B is a sequence diagram illustrating a calculation example of T_U and T_D according to the second embodiment.

In step S706, when an acknowledgement frame of which sequence number is 17 (in FIG. 7B, ACK (17)) is received at the time point 623-n3, the time point 623-n3 is written to a region, t_comp, prepared to hold the time point when transmission completion of a data transmission request is recognized among portions retaining information corresponding to the data transmission request 603 in the main region 751. When writing to t_comp is performed, at least a subsequently received data transmission request is treated as a separate burst.

In step S707, a bundled region of which the time point 623-n3 is written in t_comp is kept as a reference region for deriving the interval T_U and the interval T_D.

In step S708, when the data transmission request 604 is received at a time point 614, 614 is written to t_acpt in a new write region, and "20" is written to the track SN when the sequence number of the last data frame generated with the data transmission request 604 (in this case, 20) is recognized.

In step S709, when the data transmission request 605 occurs, the time point 615 and the sequence number "22" are retained to the auxiliary region 752, as in the above.

In step S710, when a data frame concerning the data transmission request 605 is determined to be transmitted in the same burst as the data transmission request 604, a portion retaining information corresponding to the data transmission request 604 in the main region 751 is updated with information corresponding to the data transmission request 605 (i.e., the time point 615 and the retained sequence number 22).

In step S711, when the data transmission request 606 occurs, the time point 616 and the sequence number 24 are retained to the auxiliary region 752.

In step S712, when a data frame concerning the data transmission request 606 is determined to be transmitted in the same burst as the data transmission request 605, a portion retaining information corresponding to the data transmission request 605 in the main region 751 is updated with information corresponding to the data transmission request 606 (i.e., the time point 616 and the retained sequence number 24).

Figure 7C:
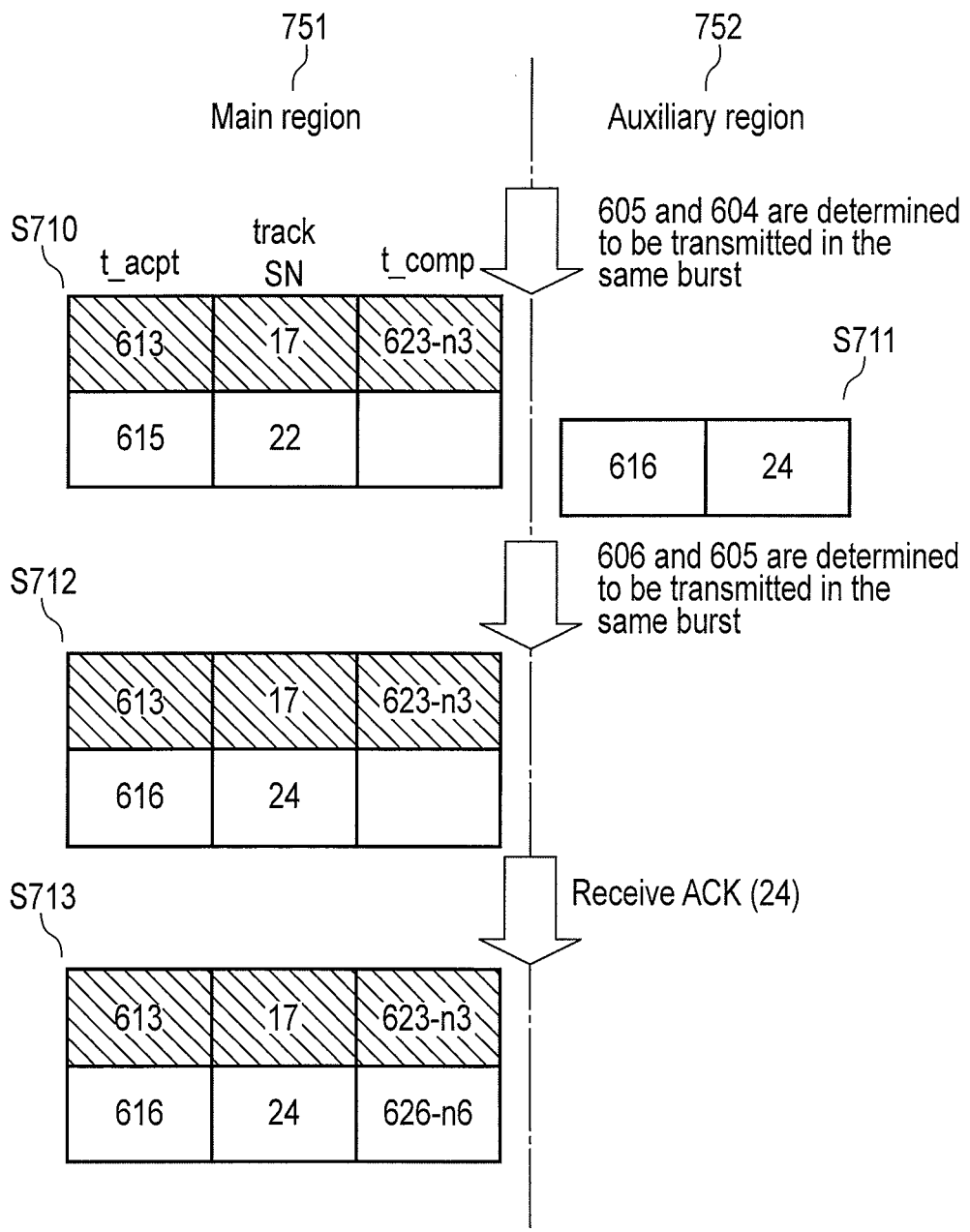
FIG. 7C is a sequence diagram illustrating a calculation example of T_U and T_D according to the second embodiment.
Figure 7D:
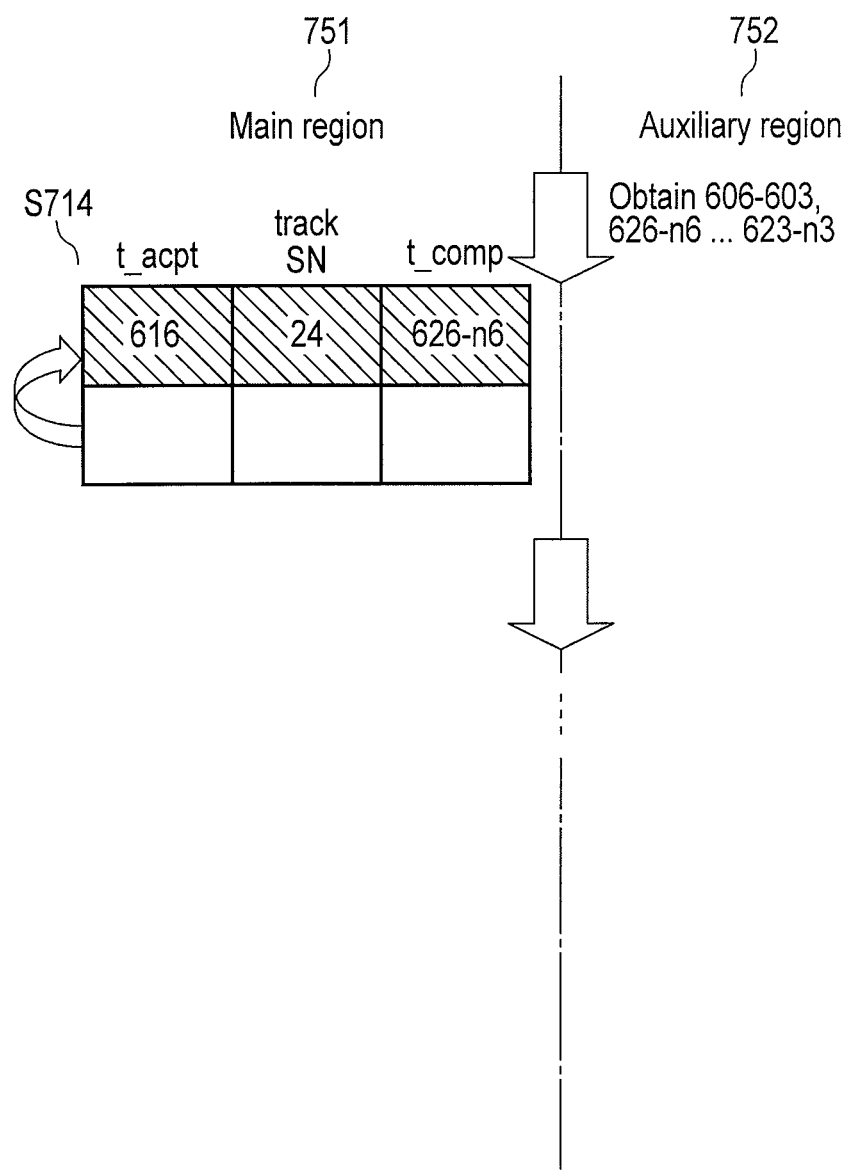
FIG. 7D is a sequence diagram illustrating a calculation example of T_U and T_D according to the second embodiment.

In step S713, when an acknowledgement frame of which sequence number is 24 (in FIG. 7C, ACK (24)) is received at the time point 626-n6, 626-n6 is written to t_comp.

The transceiving processor 204 obtains differences, such as a difference between the time point 613 and the time point 616 and a difference between the time point 616 and a time point written to subsequent t_acpt by successively performing the above processing. These differences are statistically processed, whereby the interval T_U can be obtained. Likewise, the interval T_D can also be obtained by successively obtaining a difference between the time point 626-n6 and the time point 623-n3 and a difference between the time point 626-n6 and a time point subsequently written to t_comp.

After the time difference is obtained, like in step S714, the previous reference region is rewritten with the write information retaining information concerning the current data transmission request 606, i.e., information written in step S713 (t_acpt as "616", track_SN as "24", t_comp as "626-n6"), and the write region is cleared to retain information about a subsequent burst, so that the efficiency of memory usage can be improved. In this case, the same processing can be repeated by going back to step S707.

It should be noted that the interval T_U represents an intermediate value of acceptance of the data transmission requests corresponding to the first burst and an intermediate value of acceptance of the data transmission requests corresponding to the subsequent burst in FIG. 6. On the other hand, according to the processing as shown in FIG. 7, a value obtained by statistically processing a difference between the time point of acceptance of the last data transmission request corresponding to the first burst and the time point of acceptance of the last data transmission request corresponding to the subsequent burst is obtained. When the interval T_U is preferred to be obtained as the difference between the time point of acceptance of the first data transmission request corresponding to the first burst and the time point of acceptance of the first data transmission request corresponding to the subsequent burst, it can be obtained by not rewriting but retaining the time point written to t_acpt in FIG. 7 as it is when determination to transmit in the same burst is made.

The method for correcting the interval T_U may be a method for retaining the minimum value of the data transmission request interval and the number of times of updates of the retained sequence number (average), and making correction based on a mathematical expression "T_U+minimum value×the number of updates".

For example, in the example of FIG. 6, in the first burst, the data transmission request 602 as well as the data transmission request 603 are determined to be transmitted together with the data transmission request 601, and accordingly, the number of times of updates of the retained sequence number is two in the main region. Likewise, in the subsequent burst, the data transmission requests 604, 605 and 606 are transmitted together, and the number of times of updates of the retained sequence number is two. As described above, the transceiving processor 204 statistically collects the average of the number of times of updates of the retained sequence number.

In addition, the minimum value of the interval of the time point of acceptance of each data transmission request is updated and retained. More specifically, in the example of FIG. 6, first, the transceiving processor 204 retains a difference value (first difference value) between the time point 612 and the time point 611. Thereafter, when the time point 613 is recognized, a difference value (second difference value) between the time point 613 and the time point 612 is calculated, and the second difference value and the first difference value are compared. A smaller value of the second difference value and the first difference value is retained as the minimum value of the interval of the data transmission request. This is successively repeated, and in the example of FIG. 6, comparison is made with the minimum value of the interval of the data transmission requests retained and a difference value until the time point 616 is recognized. When a difference value is smaller than the retained minimum value, update processing is performed. When they are the same value, any one of them may be chosen.

On the other hand, the transceiving processor 204 derives, as the interval T_U, a value obtained by statistically processing the intervals of the data transmission requests (average value, intermediate value, or the like) like the first embodiment. Then, when the interval T_U is used to control the data transmission, the interval T_U is used upon making correction with "T_U+the minimum value×the number of updates".

According to the second embodiment explained above, the bundled data transmission requests are burst-transmitted at a time, and the interval of bursts is recognized, so that while an interval during ideal operation is maintained, the data transmission can be efficiently controlled.

(Third Embodiment)

The third embodiment shows a case where the interval T_U and the interval T_D are recognized for the format in which aggregation processing is performed on data frames. The aggregation processing is processing for aggregating a plurality of data frames into one physical packet.

A data frame format when the aggregation processing is applied will be explained with reference to FIG. 8.

FIG. 8 shows a case where two data frames are aggregated to make one virtual frame. A data frame format 800 when the aggregation processing is applied is substantially the same as the data frame format as shown in FIG. 3, but is different in a common header 801.

The common header 801 includes not only the transmission destination address and the transmission source address but also a number of conjunctions. The number of conjunctions represents the number of data frames aggregated. To increase the number of data frames being aggregated, a set of a sub-header 302, a frame body 303, and an FCS 304 (which is called a frame set for the sake of convenience in this case) can be used as one unit and aggregated. The number "2" is written to the number of conjunctions field of the common header 801 when, for example, the number of conjunctions of the frame sets (in other words, the number of frame bodies being aggregated) is two. When the number of conjunctions is one, 1 is written to the number of conjunctions field.

The frames aggregated as shown in FIG. 8 are given to the PHY processor 203 as one virtual frame. The PHY processor 203 converts this into one physical packet, and transmits the physical packet via the frequency converter 202 and the antenna 201 to the wireless communication apparatus of the communicating party. This aggregation processing may be applied only to data within the same data transmission request, or may be applied to data in continuous data transmission requests.

Figure 4:
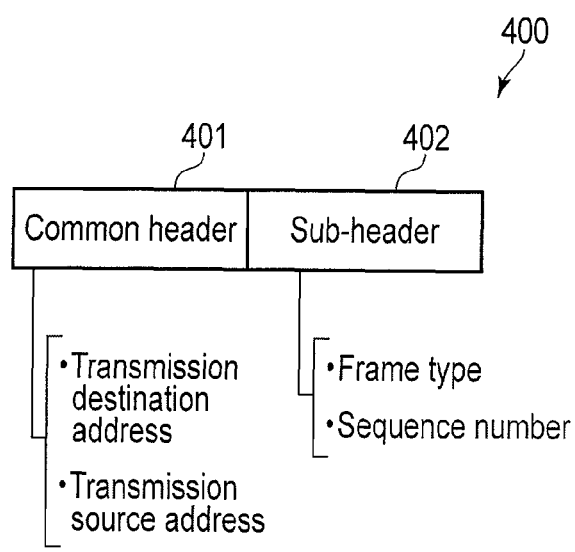
FIG. 4 is a figure illustrating an example of an acknowledgement frame format.

An acknowledgement frame in response to the aggregated frames has the same format as the frame format of FIG. 4. Therefore, like the first embodiment, the described sequence number is the maximum sequence number of sequence numbers that were able to be successively received, among the frame bodies 303 of the data frames that were able to be correctly received and decoded.

More specifically, for example, in the wireless communication apparatus 101, there are three data frames concerning a data transmission request 601, of which sequence numbers are 10, 11 and 12, respectively, and there are also three data frames concerning a data transmission request 602, of which sequence numbers are 13, 14 and 15, respectively. In the third embodiment, they are transmitted as one physical packet, and when the wireless communication apparatus 102 receiving them fails to receive or decode the frame body corresponding to the sequence number 14, the sequence number of the acknowledgement frame transmitted from the wireless communication apparatus 102 is "13".

A method for recognizing reception of all the acknowledgement frames up to the one for the last data frame concerning a data transmission request is as follows. When the sequence number included in an acknowledgement frame is equal to or more than the retained sequence number when the transceiving processor 204 of the wireless communication apparatus 101 receives the acknowledgement frame, the time point at which the acknowledgement frame is received is determined to be a time point at which the acknowledgement frame in response to the last data frame concerning the data transmission request is received. In the above example, the sequence number "13" described in the acknowledgement frame is more than sequence number "12" of the last data frame concerning the data transmission request 601, and therefore, the time point at which the acknowledgement frame of the sequence number "13" is received is the time point at which completion of the data transmission request 601 is recognized.

As described above, when a case where the sequence number of the acknowledgement frame is equal to or more than the retained sequence number is adopted as the determination condition, determination can be made to a case where a plurality of data frames over a plurality of data transmission requests are aggregated and transmitted.

Even with the aggregation processing, when the sequence number of the acknowledgement frame is equal to the sequence number retained in the transceiving processor 204 as in the second embodiment, the reception completion time point of the acknowledgement frame may be determined to be a time point at which the data transmission request is achieved. This is because, in the second embodiment, all the data frames generated from the last data transmission request included in a certain burst are transmitted, and acknowledgements up to the one in response to the last data frame are received, and thereafter the value to derive each interval is obtained.

A number of data frames aggregated may be adjusted using the calculated interval T_U and the interval T_D. For example, when the interval T_U is equal to the interval T_D, the maximum number of conjunctions may be increased.

According to the third embodiment explained above, even when the aggregation processing is performed, achievement of a data transmission request can be recognized, and this allows control of the data transmission while recognizing the situation of the wireless medium.

(Fourth Embodiment)

In the first embodiment to the third embodiment, an acknowledgement frame notifies the maximum sequence number of those which are successively received with success. The fourth embodiment is different therefrom in that the fourth embodiment uses a method in which a plurality of data frames are received, and a response with which delivery confirmation of each data frame can be distinguished is transmitted, so that the apparatus transmitting data frames can select a data frame and retransmit the data frame (hereinafter referred to as a selective repeat method).

The selective repeat method is, for example, the Block Ack method used in IEEE802.11 wireless LAN family standard. In this method, the acknowledgement frame is called a Block Ack frame. Instead of notifying the maximum sequence number of those which are successively received with success, a field to which a bit map is written and a field for notifying a sequence number corresponding to the first bit of the bit map are provided. When a data frame is correctly received, the corresponding bit in the bit map is "1". When a data frame is not correctly received, the corresponding bit in the bit map is "0".

A data frame corresponding to a sequence number in a portion of which bit is "1" (this is represented in an expression including a fragment number when the fragment number is also effective) indicates correct reception. A data frame corresponding to a sequence number in a portion of which bit is "0" indicates incorrect reception or failed reception. When an acknowledgement frame such as Block Ack frame is used, a wireless communication apparatus at the data frame transmission side determines whether to retransmit or not on each of the data frames.

The data frame exchange between wireless communication apparatuses according to the fourth embodiment will be explained with reference to FIG. 9.

Figure 9:
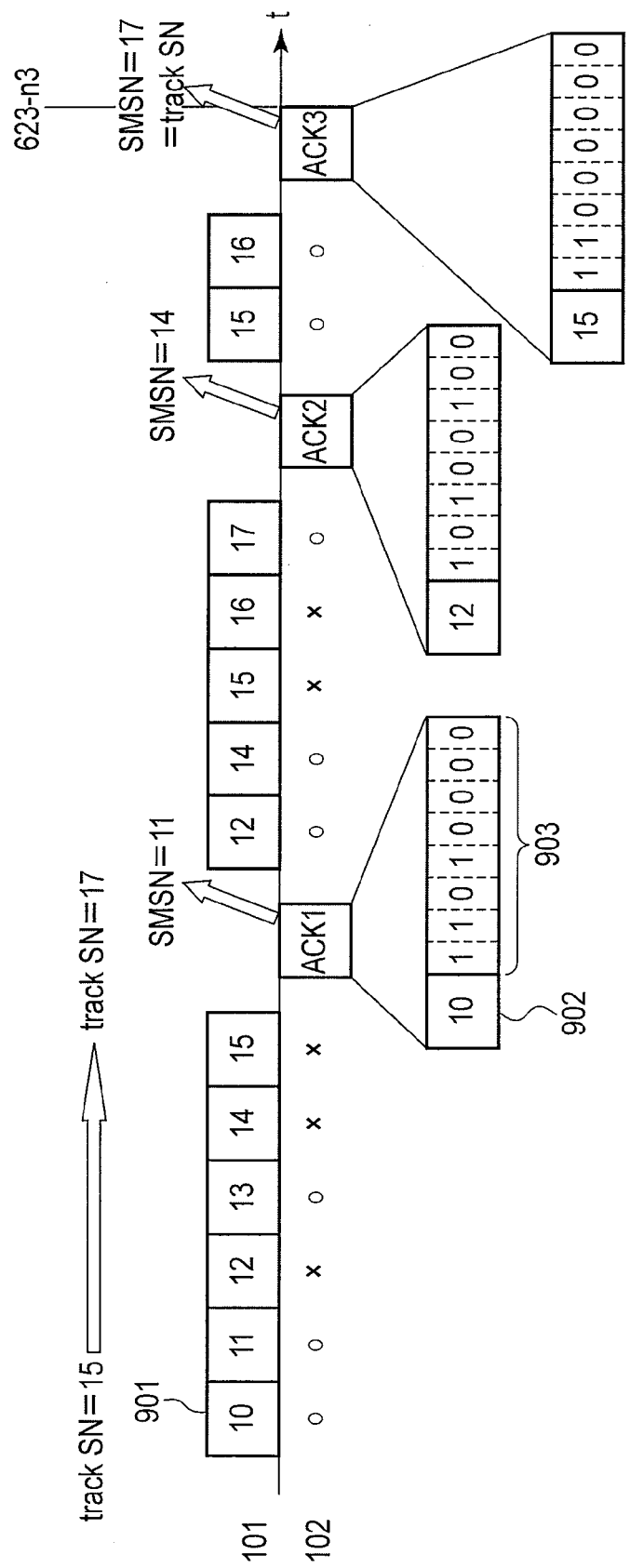
FIG. 9 is a figure illustrating an example of data frame exchange between wireless communication apparatuses according to the fourth embodiment.

In FIG. 9, operation of the wireless communication apparatus 101 at data transmission side is considered to be a case where data transmission requests are burst-transmitted as in the second embodiment and aggregation processing is performed as in the third embodiment. It should be noted that allocation of the sequence numbers to the data frames generated from each data transmission request is the same as that of FIG. 7. In this case, the wireless communication apparatus 101 retains "15" as the track SN, and transmits frame sets of which sequence numbers are 10 to 15 as an aggregation frame. Each frame transmitted by the wireless communication apparatus 101 of FIG. 9 shows only a corresponding sequence number 901 of the data frames aggregated. Acknowledgement frames transmitted by the wireless communication apparatus 102 (in FIG. 9, ACK1 to ACK3) show a starting sequence number 902 of the bit map (also referred to as a bit map starting SN) and a bit map 903.

The wireless communication apparatus 102 receives the aggregation frames from the wireless communication apparatus 101. The common header is correctly received, and whether frame bodies of frame sets subsequent thereto could be correctly received or not is indicated by "o" and "x". In this example, the frame bodies of the frame sets corresponding to the sequence numbers 10, 11, and 13 are determined to be correctly received (naturally, the sub-headers are also correctly received). On the other hand, the frame bodies of the sequence numbers 12, 14, and 15 are not correctly received (errors occur in the sub-headers, or the sub-headers are correctly received but errors are detected in the frame bodies).

As a result, the wireless communication apparatus 102 generates an acknowledgement frame of which bit map starting sequence number 902 is "10", and of which bit map 903 is "110100000" (hereinafter ACK1), and transmits the acknowledgement frame to the wireless communication apparatus 101. In this case, for example, in the acknowledgement frame, the bit map 903 has a fixed length of eight, but the length of the fixed length may be defined in advance, or the bit map 903 may be of a variable length. When the bit map 903 is of a variable length, it is preferable to notify length information about the bit map 903.

When the wireless communication apparatus 101 correctly receives ACK1, the controller 206 of the wireless communication apparatus 101 recognizes that the maximum sequence number which the wireless communication apparatus 102 successively and successfully receives (which may be hereinafter referred to as SMSN (Successive Maximum Sequence Number)) is "11" based on the contents of ACK1. In this case, before the wireless communication apparatus 101 receives and decodes ACK1 and recognizes the SMSN, the wireless communication apparatus 101 had updated the track SN from "15" to "17". Since the sequence number "11" successively received with success is less than "17" written in the track SN, the controller 206 determines that the data transmission request is not achieved.

Subsequently, the wireless communication apparatus 101 transmits frame sets of which sequence numbers are 12, 14 and 15 as well as 16 and 17 which are new to the wireless communication apparatus 102 as an aggregation frame.

The wireless communication apparatus 102 correctly receives frame bodies of frame sets corresponding to the sequence numbers 12, 14, and 17, but fails to correctly receive frame bodies of the sequence numbers 15 and 16. The wireless communication apparatus 102 generates an acknowledgement frame of which bit map starting sequence number 902 is "12", and of which bit map 903 corresponding to the sequence number starting from 12 is "10100100" (hereinafter ACK2), and transmits the acknowledgement frame to the wireless communication apparatus 101. It should be noted that the wireless communication apparatus 102 may also cause the sequence number corresponding to the frame body that could be received correctly in the past to be represented as being correct (i.e., "1") in the bit map 903. In this case, the bit map 903 of ACK2 is "11100100".

The controller 206 of the wireless communication apparatus 101 having received ACK2 correctly recognizes that the SMSN is "14". However, the value of the SMSN "14" is less than the value of the track SN "17", and therefore, the controller 206 determines the transmission request is not achieved. Accordingly, the wireless communication apparatus 101 transmits frame sets of which sequence numbers are "15" and "16" to the wireless communication apparatus 102 as an aggregation frame.

When these frame sets are correctly received by the wireless communication apparatus 102, the wireless communication apparatus 102 generates and transmits an acknowledgement frame of which bit map starting sequence number 902 is "15", and of which bit map 903 is "11000000" ("11100000" when the past history is also included) (ACK3).

The wireless communication apparatus 101 having correctly received ACK3 determines whether the SMSN becomes "17" and the value of the SMSN matches the value written in the track SN "17". Finally, the time point 623-n3 at which reception of ACK3 is completed is determined to be the time point at which the transmission request is achieved. Not only a case where the SMSN matches the track SN but also a case where the SMSN indicates a number equal to or more than track SN may be determined to be the time point at which the data transmission request is achieved.

On the other hand, when the selective repeat method is used to recognize the time point at which each data transmission request is achieved, the transceiving processor 204 may retain the last sequence number of each data transmission request, and may retain the first sequence number corresponding to each data transmission request. For example, the transceiving processor 204 expects that there are data transmission requests from the first data transmission request to the third data transmission request given by the upper processor 205. When data frames of which sequence numbers are 10 to 12 (when aggregated, a frame set) are generated from the first data transmission request, the sequence numbers 10 and 12 are retained as set1 of the track SN as a set. When data frames having sequence numbers 13 to 15 are generated from the second data transmission request subsequent thereto and data frames having sequence numbers 16 to 17 are further generated from the third data transmission request subsequent thereto, the sequence numbers 13 and 15 are retained as set2 of the track SN, and the sequence numbers 16 and 17 are retained as seta of the track SN.

Then, in the received acknowledgement frames, whether the acknowledgement frame concerning a data frame corresponding to a sequence number of a region for each set of the track SN has been received or not (whether there is a notification from the wireless communication apparatus 102 that it has correctly received the data frame corresponding to the sequence number or not) may be determined. Accordingly, for example, in FIG. 9, all the delivery confirmations from the sequence numbers 10 to 12 are obtained based on ACK2 which is the second acknowledgement frame, and therefore transmission completion of the first data transmission request can be recognized as being achieved when reception of ACK2 is completed.

For transmission completion of the second and third data transmission requests, the delivery confirmations for the sequence numbers 13 to 15 and the sequence numbers 16 to 17 in the region of the set of the track SN corresponding to each of them are obtained based on ACK3 which is the third acknowledgement frame. Therefore, the transceiving processor 204 can recognize that the second and third data transmission requests are achieved when reception of ACK3 is completed, and can give completion notification to the upper processor 205 with regard to the data transmission request.

It should be noted that when the time point at which each data transmission request is achieved according to the selective repeat method, as many sets of the first sequence number and sets of the last sequence number corresponding to each of the above data transmission requests as possible are preferably retained in accordance with the transmission window size according to the selective repeat method. The transmission window size is set at a value equal to or less than a reception buffer size at the data frame reception side, and is the maximum number of transmissions of the data transmission requests that can be made, or when the number of data frames is adopted as a reference, it is a value obtained by dividing the maximum number of transmissions of the data frames that can be made by the maximum number of fragments.

The selective repeat method also includes a method in which the sequence numbers are allowed to be allocated again after the data frames are generated and the sequence numbers are allocated. For example, the IEEE802.11 wireless LAN includes a method for changing the sequence numbers by a number equal to or more than the transmission window size in order to synchronize with the data frame reception side.

In order to support such case, the retained sequence numbers for comparison may be corrected to the re-allocated sequence numbers. For example, a difference between a previous sequence number and a re-allocated sequence number is recognized, and the retained sequence number is corrected using the difference value. Conversely, when the retained sequence numbers are sequence numbers before re-allocation when an acknowledgement frame is received, the sequence numbers of the acknowledgement frame may be compared upon being corrected to values corresponding to the old sequence order using the difference value.

According to the fourth embodiment explained above, in the selective repeat method, the data transmission can be controlled while recognizing the situation of the wireless medium, like the other embodiments.

(Fifth Embodiment)

The fifth embodiment is different from the other embodiments in that the throughput value is looked up, and the data transmission is controlled. The throughput value is the amount of data of which transmission is completed per unit time. In the fifth embodiment, for example, the transceiving processor 204 is considered to statistically obtain the throughput value.

An example of a method for obtaining the throughput value includes the following method. In a situation where the wireless communication apparatus 101 transmits data frames to the wireless communication apparatus 102, the transceiving processor 204 of the wireless communication apparatus 101 transmits the data frames from a certain observation start time point t_start to an observation end time point t_end. The transceiving processor 204 obtains the summation of the sizes of the payload portions of the data frames for which acknowledgement frames have been obtained for the transmitted data frames. The summation of the sizes of the payload portions is deducted from the observation time, i.e., t_end to t_start, thus obtaining the throughput value.

The payload portion of the data frame is a portion including data obtained when a data transmission request is received and the data are received from the upper processor 205 in data frames when one or more data frames are generated. Usually, it means a frame body of a data frame.

When the transceiving processor 204 generates a data frame, the transceiving processor 204 may perform padding processing on a frame body in order to correct the size of the entire data frame or the frame body to a byte length or correct it to an integer multiple of a certain fixed byte length (for example, an integer multiple of two bytes or an integer multiple of four bytes). When the padding processing is performed, the length added in the padding processing is excluded in order to derive a correct throughput value.

Alternatively, an accumulative size of target transmission data is obtained in each unit time from the time point at which the transmission completion concerning the data transmission request is recognized to the time point at which the transmission completion concerning the subsequent data transmission request is recognized, and the throughput value can be calculated by dividing the accumulative size by a unit period. For example, when the interval T_D is statistically obtained according to the method as shown in FIG. 7, an item of an accumulative data size is added to a write region corresponding to the track SN of the main region, and an item of a data size corresponding to a sequence number is also added to the track SN of the auxiliary region. When the data frame is determined to be transmitted in the same burst, the data size value of the auxiliary region may be added to the item of the accumulative data size when the item of the main region is updated.

When these items are looked up, in a stage of calculating a time difference between previous t_comp and subsequent t_comp, the throughput value can be obtained by dividing the accumulative data size written to subsequent t_comp by a time difference. When the throughput value is obtained in each period and processing determination is made using the throughput value, a statistically processed value may be used such as an average or intermediate value of the throughput value in each period until then.

When the data size in the data transmission request from the upper processor 205 is of a fixed length, and the data transmission requests thereof occur with a constant interval, an ideal throughput value can be obtained from the selected access method and transmission rate. Accordingly, for example, the ideal throughput value is calculated and retained in advance as a comparison reference value, and the ideal throughput value and the actual throughput value are compared. When the actually measured throughput value is the same as the ideal throughput value, it is determined to control the data transmission such as sleep control. When the actually measured throughput value is less than the ideal throughput value, it is determined not to control the data transmission.

After the control of the data transmission, the throughput value is measured, and when the value is equal to the ideal throughput value, control of the data transmission is determined to be appropriate. Accordingly, the current state is maintained, or adjustment is made actively. More specifically, "control of the data transmission is appropriate" means as follows. When the sleep control is performed with an interval of the interval T_U, this means that the time adjustment of T_U is appropriate, and accordingly, the length of the interval T_U may be maintained, or the length of the interval T_U may be increased. On the other hand, when the measured throughput value is less than the ideal throughput value, control of the data transmission is reconsidered, and adjustment is made all over again or the control of the data transmission is stopped.

When a period is divided into a period in which data frames are actually exchanged and a period in which data frames are not exchanged, e.g., the control of transmission of data is the sleep control, the following method may be employed. After the sleep control, the throughput is measured only in a normal mode period which is a period in which data frames are exchanged, and the ideal maximum throughput value is used for comparison. The ideal maximum throughput can be obtained from the maximum size of the frame body and the selected access method and transmission rate.

When the measurement throughput value during the normal mode period is less than the ideal maximum throughput value, the efficiency during the normal mode period is considered to be still low and there is much room for improvement. Accordingly, the normal mode period is reduced, or a period in which no data frames are exchanged (in the case of the sleep control, the sleep period) is increased. On the other hand, the measurement throughput value during the normal mode period can be determined to be equal to the ideal maximum throughput value within an allowable range, the efficiency during the normal node period is determined to be close to the ideal state, and the length of the normal mode period is determined to be appropriate. Accordingly, the normal mode period is maintained.

However, it is not limited to the above normal mode period. Alternatively, comparison with the ideal throughput value in view of the interval of the data transmission and the data size and the measured throughput value may be preferentially used. When the control of the data transmission is determined to be appropriate in this comparison, the measurement throughput during the normal mode period and the ideal maximum throughput are compared, and the result thereof may be used for determination as to whether more active adjustment is to be made or not.

According to the fifth embodiment explained above, the throughput value is obtained and compared with the ideal throughput value, whereby data transmission can be controlled in view of the throughput value, and more ideal control can be performed.

(Sixth Embodiment)

In the first embodiment to the fifth embodiment, the interval T_U of the data transmission request is obtained by causing the transceiving processor 204 to receive a data transmission request from the upper processor 205, and causes the transceiving processor 204 to look up the data transmission request. On the other hand, the sixth embodiment is different from the above embodiments in that the interval T_U is derived according to other methods.

When the upper processor 205 gives a data transmission request to the transceiving processor 204, the upper processor 205 manages the transmission timing of the data transmission request. Therefore, the upper processor 205 may notify the controller 206 of the interval T_U. When the upper processor 205 gives a subsequent data transmission request to the transceiving processor 204, an interval from the previous data transmission request may be notified to the controller 206, and the controller 206 may statistically obtain the interval T_U. In such case, in the wireless communication apparatus of FIG. 2, the controller 206 may be directly connected to the upper processor 205.

In operation where, due to the sleep control, supply of electric power to the transceiving processor 204 and the controller 206 is stopped, and the transceiving processor 204 does not receive the data transmission request, the recognition of the interval T_U after the sleep control is carried out is preferably based on the time point at which the upper processor 205 generates a data transmission request for the transceiving processor 204 depending on the control method of the data transmission. If the data generation time point is included in the data transmission request when the upper processor 205 generates the data transmission request, the transceiving processor 204 and the controller 206 can return back to the normal operation mode to recognize the time point actually generated when the data transmission request is received. Therefore, the controller 206 can recognize the interval T_U based on the data generation time point without being affected by the sleep control.

When the wireless communication apparatus is, for example, a sensor module, data to be transmitted are generated when the sensor detects environmental change or based on an interval with which the sensor is activated. Accordingly, the detected interval with which the sensor obtains an environmental change is notified to the controller 206.

It should be noted that the sensor may notify the interval T_U obtained by statistically processing the interval, or may notify the interval detected by the sensor to the controller 206 and the controller 206 may perform statistical processing to obtain the interval T_U. Alternatively, the activation interval of the sensor may be notified to the controller 206, and the activation interval may be adopted as the interval T_U.

According to the sixth embodiment explained above, the interval of the data transmission request can be obtained according to the method different from the first embodiment to the fifth embodiment, and the data transmission can be controlled while recognizing the situation of the wireless medium.

(Seventh Embodiment)

In the first embodiment to the sixth embodiment, the interval T_U and the interval T_D are used to control the data transmission. The seventh embodiment is different in that the data transmission is controlled using an interval from a time point at which achievement of a data transmission request is recognized to a time point at which a subsequent data transmission request is received.

Data frame exchange between wireless communication apparatuses according to the seventh embodiment will be explained with reference to FIG. 10.

Figure 10:
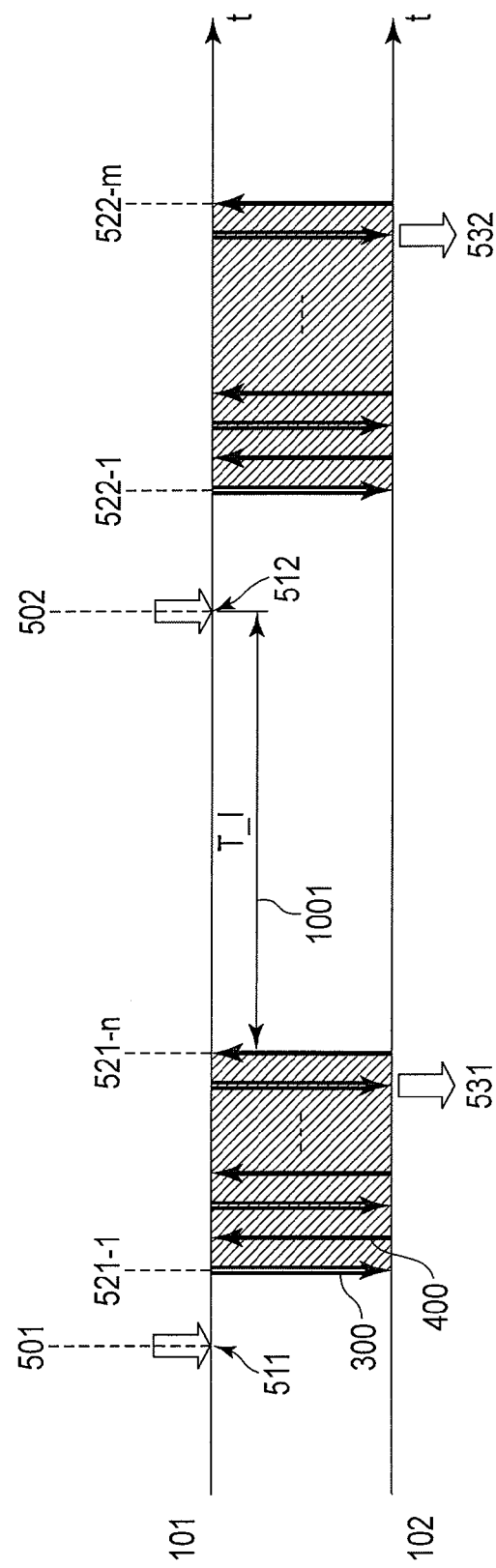
FIG. 10 is a figure illustrating an example of data frame exchange between wireless communication apparatuses according to the seventh embodiment.

As shown in FIG. 10, an interval T_I 1001 is used instead of the interval T_U and the interval T_D. The interval T_I 1001 is the interval from the time point at which achievement of a data transmission request is recognized to a time point at which a subsequent data transmission request is received. More specifically, the interval T_I 1001 is the time interval from a time point 521-n at which achievement of a data transmission request 501 is recognized to a time point 512 at which a subsequent data transmission request 502 is received. The interval T_I 1001 is statistically calculated like the interval T_U 541 and the interval T_D 542, and may be used to control the data transmission. Alternatively, instead of the time point at which the subsequent data transmission request is received, a time point at which a subsequent track SN is retained may be employed.

Figure 11:
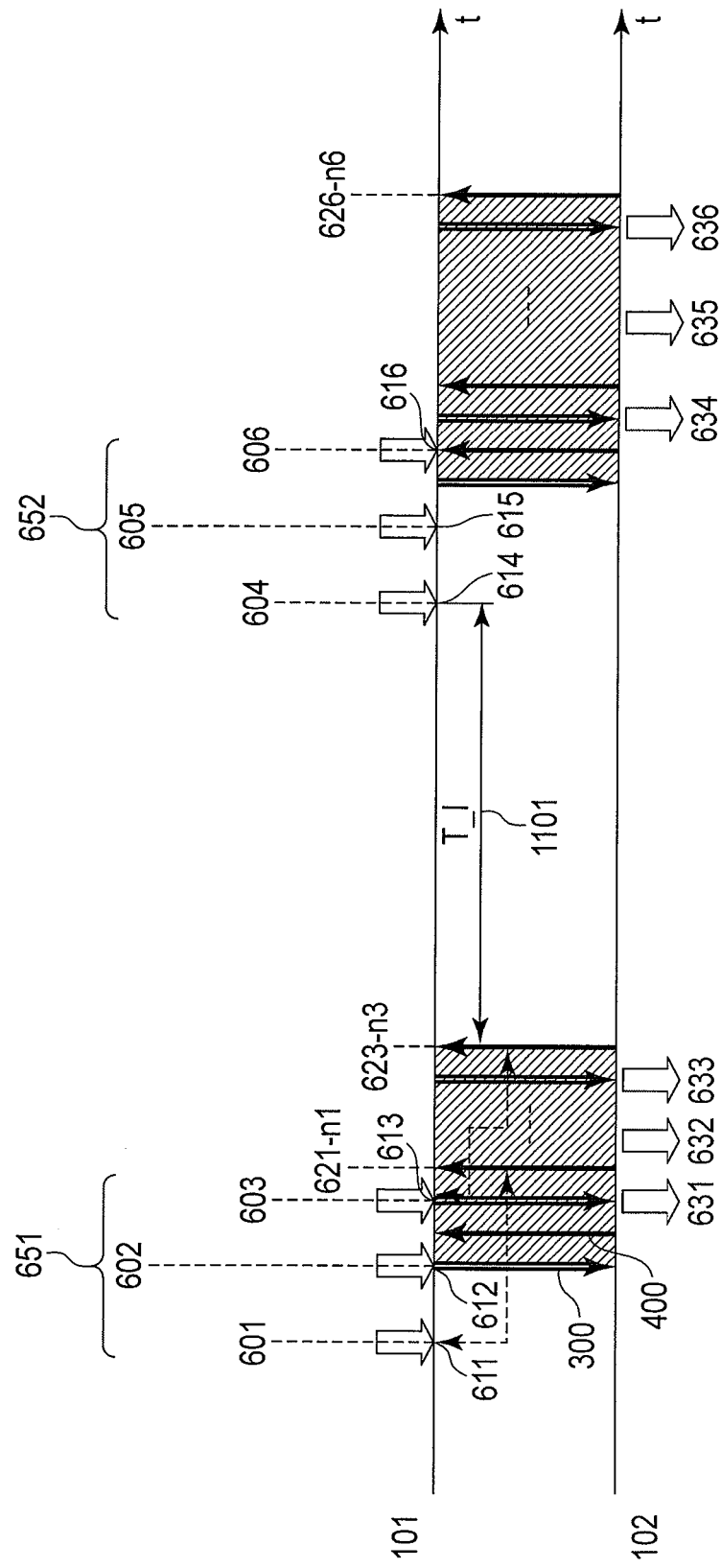
FIG. 11 is a figure illustrating an example of data frame exchange between the wireless communication apparatuses according to the seventh embodiment when burst transmission is taken into consideration.

Subsequently, data frame exchange between wireless communication apparatuses according to the seventh embodiment in view of the burst transmission will be explained with reference to FIG. 11.

Like the case of FIG. 10, the interval T_I 1101 may be used even in the case of the burst transmission. In the example of FIG. 11, it is an interval from a time point 623-n3 at which achievement of a data transmission request 603 in a burst transmission 651 is recognized to a time point 614 at which a data transmission request 604 is received in a subsequent burst transmission 652.

Like the above embodiments, the sleep control can be performed as the control of the data transmission using the interval T_I. For example, when the interval T_I is more than the threshold value, the sleep control may be performed. This threshold value is a time interval of at least transition from the normal mode to the sleep mode and recovery from the sleep mode to the normal mode.

When operation is considered in which, with the sleep control, the transceiving processor 204 does not receive any data transmission request, the interval T_I may be calculated as follows. When the upper processor 205 generates a data transmission request, the transceiving processor 204 is activated, and the transceiving processor 204 receives the data transmission request, and the interval T_I may be calculated using the received time point.

According to the seventh embodiment explained above, the data transmission can be controlled while recognizing the situation of the wireless medium like the above embodiments, based on the period from the time point at which achievement of the data transmission request is recognized to a time point at which the subsequent data transmission request is received.

(Eighth Embodiment)

In the first embodiment to the seventh embodiment, the data transmission request is unique and is not distinguished. However, a data transmission request generated by the upper processor 205 may be considered to have, for example, different levels of Quality of Service (QoS). Further, there may be a plurality of wireless communication apparatuses instead of only one wireless communication apparatus. The eighth embodiment is different in that, they are distinguished, and the interval T_U and the interval T_D, a time point at which the data transmission request is achieved, or the interval T_I are obtained for each QoS and each wireless communication apparatus.

When the data transmission requests are distinguished for each QoS, a QoS identifier is added to a data transmission request given by the upper processor 205. The transceiving processor 204 may perform the above processing for each QoS identifier. For example, the main region and the auxiliary region as shown in FIG. 7 may be prepared for each QoS identifier, and the same processing may be performed.

When there are a plurality of wireless communication apparatuses to be communicated with, the data transmission request given by the upper processor 205 includes an identifier (address) of the wireless communication apparatus of the transmission destination. Therefore, the interval T_U and the interval T_D, or the recognition time point of the data transmission completion, or the interval T_I can be obtained while distinguishing each wireless communication apparatus of the communicating party.

For example, when control concerning data transmission is performed such as link adaptation, adjustment of the number of conjunctions, and polling cycle, the adjustment is preferably made for each wireless communication apparatus, and the transceiving processor 204 may perform processing for each wireless communication apparatus of the transmission destination (communicating party). The processing of the memory region as shown in FIG. 7 may be processed upon preparing the main region and the auxiliary region of FIG. 7 for each wireless communication apparatus of the transmission destination.

In the sleep control, it is not necessary to distinguish wireless communication apparatuses of transmission destinations for transmission periods of data frames given by the wireless communication apparatus in question. However, when each wireless communication apparatus of the transmission destination also performs the sleep control, and in addition, the transmission periods of the data frames given by the wireless communication apparatus in question are adjusted, the data frames given by the wireless communication apparatus in question must be transmitted in accordance with the normal operation mode of the wireless communication apparatus of each transmission destination. Therefore, when the data transmission request is received, processing should be done while distinguishing the wireless communication apparatus of each transmission destination.

In the above explanation, the method for making identification for each QoS or the wireless communication apparatus of each transmission destination has been hereinabove explained. However, when other identification information is present for a data transmission request, processing may be changed using the identification information. Processing based on these identifiers may be combined.

According to the eighth embodiment explained above, the data transmission is controlled for each QoS and each wireless communication apparatus, so that the data transmission can be controlled more efficiently while recognizing the situation of the wireless medium.

(Ninth Embodiment)

In the ninth embodiment, a buffer is provided in addition to the configuration of the wireless communication apparatus of FIG. 2. The buffer may be provided within the transceiving processor 204. Alternatively, the buffer may be provided within the memory. The wireless communication apparatus of the ninth embodiment is configured to include the buffer, which allows the transmitted and received frames to be retained in the buffer, to easily perform the retransmission processing and external output processing.

(Tenth Embodiment)

A wireless communication apparatus according to the tenth embodiment includes a bus, a processor, and an external interface in addition to the configuration of the wireless communication apparatus of the ninth embodiment. The processor and the external interface are connected to the buffer through the bus. In the processor, firmware is operated. The wireless communication apparatus of the tenth embodiment is configured to include the firmware, which allows a function of the wireless communication device to be easily changed.

(Eleventh Embodiment)

In the eleventh embodiment, a clock generation unit is provided in addition to the configuration of the wireless communication apparatus of FIG. 2. The clock generator generates a clock and outputs the clock from an output terminal to the outside of the wireless communication device. The clock generated in the wireless communication device is externally output, and a host side is operated by the externally-output clock, which allows the host side and the wireless communication device side to be operated in synchronization with each other.

(Twelfth Embodiment)

A wireless communication apparatus according to the twelfth embodiment includes a power supply, a power supply controller, and a wireless power feeder in addition to the configuration of the wireless communication apparatus of FIG. 2. The power supply controller is connected to the power supply and the wireless power feeder to control selection of an electricity source supplied to the wireless communication apparatus. The wireless communication device of the twelfth embodiment is configured to include the power supply, which allows the low power-consumption operation in which the power supply is controlled.

(Thirteenth Embodiment)

In the thirteenth embodiment, an NFC (Near Field Communications) transceiver is added to the configuration of the wireless communication apparatus according to the twelfth embodiment, and connection is made with the power supply controller and the transceiving processor 204. As described above, the NFC transceiver is provided in the wireless communication apparatus, so that authentication processing can be performed easily, and using the NFC transceiver as a trigger, power supply control is performed, and this reduces power consumption in the standby state.

(Fourteenth Embodiment)

A wireless communication apparatus according to the fourteenth embodiment includes an SIM card in addition to the configuration of the wireless communication apparatus according to the twelfth embodiment. The SIM card is connected to the transceiving processor 204. The wireless communication device of the fourteenth embodiment is configured to include the SIM card, which allows authentication processing to be easily performed.

(Fifteenth Embodiment)

A wireless communication apparatus according to the fifteenth embodiment includes a moving image compression/decompression unit in addition to the configuration of the wireless communication apparatus of the tenth embodiment. The moving image compression/decompression unit is connected to the bus. The wireless communication device of the fifteenth embodiment is configured to include the moving image compression/decompression unit. Therefore, the compressed moving image can easily be transmitted and the received compressed moving image can easily be decompressed.

(Sixteenth Embodiment)

In the sixteenth embodiment, an LED unit is provided in addition to the configuration of the wireless communication apparatus of FIG. 2. The LED unit is connected to the transceiving processor 204 or the PHY processor 203. The wireless communication device of the sixteenth embodiment is configured to include the LED unit, which allows the user to be easily notified of the operating state of the wireless communication device.

(Seventeenth Embodiment)

In the seventeenth embodiment, a vibrator unit is provided in addition to the configuration of the wireless communication apparatus of FIG. 2. The vibrator unit is connected to the transceiving processor 204 or the PHY processor 203. The wireless communication device of the seventeenth embodiment is configured to include the vibrator unit, which allows the user to be easily notified of the operating state of the wireless communication device.

(Eighteenth Embodiment)

In the eighteenth embodiment, a plurality of different PHY processors 203 are provided, and a wireless switching unit is included in addition to the configuration of the wireless communication apparatus of FIG. 2. The wireless switching unit is connected to the plurality of different PHY processors 203 to switch communication among the different PHY processors 203. The wireless communication device of the eighteenth embodiment is configured to include the plurality of different PHY processors 203, so that the communication can be switched such that the proper PHY processor 203 is used depending on the situation.

(Nineteenth Embodiment)

In the nineteenth embodiment, a plurality of different PHY processors 203 are provided, transceiving processors 204 respectively corresponding to the plurality of different PHY processors 203 are provided, and a wireless switching unit is included in addition to the configuration of the wireless communication apparatus of FIG. 2. The wireless switching unit is connected so as to switch communication among the transceiving processors 204, and the wireless switching unit switches a plurality of communication methods by different transceiving processors 204 and PHY processors 203. One of pairs of transceiving processors 204 and PHY processors 203 corresponds to, for example, a wireless LAN. As described above, a plurality of different sets of transceiving processors 204 and PHY processors 203 are provided in the wireless communication apparatus, so that the communication can be switched using a set of transceiving processor 204 and PHY processor 203 appropriate for the situation.

(Twentieth Embodiment)

A wireless communication apparatus according to the twentieth embodiment includes a switch (SW) in addition to the configuration of the wireless communication apparatus of the eighteenth embodiment. The switch is connected to the antenna 201, the plurality of different PHY processors 203, and the wireless switching unit. The wireless communication apparatus of the twentieth embodiment is configured to include the switch, so that the communication in which the proper PHY processor 203 is used can be switched depending on the situation while the antenna is shared.

(Twenty-First Embodiment)

A wireless communication apparatus according to the twenty-first embodiment includes a switch (SW) in addition to the configuration of the wireless communication apparatus of the nineteenth embodiment. The switch is connected to the antenna 201, the transceiving processors 204, and the wireless switching unit. The wireless communication apparatus of the twenty-first embodiment is configured to include the switch, so that the communication in which a proper set of transceiving processor 204 and PHY processor 203 is used can be switched depending on the situation while the antenna is shared.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication apparatus, comprising:
    a first processor configured to generate a plurality of first data frames for transmitting first data if a first transmission request of the first data is received from an upper layer, and generate a plurality of second data frames for transmitting second data if a second transmission request of the second data is received from the upper layer after receipt of the first transmission request from the upper layer, the plurality of first data frames and the plurality of second data frames being frames used on a media access control layer;
    a second processor configured to convert the plurality of first data frames and the plurality of second data frames into a plurality of first physical packets and transmit the plurality of first physical packets through one or more antennas, and receive, through the one or more antennas, a plurality of second physical packets and convert the plurality of second physical packets into a plurality of first acknowledgement frames and a plurality of second acknowledgement frames, the plurality of first acknowledgement frames corresponding to the plurality of first data frames and used on the media access control layer, and the plurality of second acknowledgement frames corresponding to the plurality of second data frames and used on the media access control layer, each of the first acknowledgement frames and the second acknowledgement frames containing a sequence number field which indicates a maximum sequence number of successively received sequence numbers; and a controller configured to retain a first interval relating to a time interval between the first transmission request and the second transmission request and a second interval relating to a time interval between a first time point and a second time point, wherein the controller is configured to compare the first interval and the second interval, and control transmission of frames on the media access control layer based on a result of the comparison between the first interval and the second interval, and wherein the first time point is a time point at which a first acknowledgment frame from among the plurality of first acknowledgement frames which contains a sequence number indicating a last sequence number of the plurality of first data frames is received, and the second time point is a time point at which a second acknowledgment frame from among the plurality of second acknowledgement frames which contains a sequence number indicating a last sequence number of the plurality of second data frames is received.

2. The apparatus according to claim 1, wherein the controller controls a transmission interval of a frame to be transmitted based on the first interval and the second interval.

3. The apparatus according to claim 1, wherein:
the first processor is configured to generate a plurality of third data frames for transmitting third data when a third transmission request of the third data is received from the upper layer,
the second processor is configured to convert the plurality of third data frames into a plurality of third physical packets and transmits the plurality of third physical packets through the one or more antennas, and receive, through the one or more antennas, a plurality of fourth physical packets and convert the plurality of fourth physical packets into a plurality of third acknowledgement frames corresponding to the plurality of third data frames, and
the controller is configured to update the first interval based on a third time point at which the third transmission request is received from the upper layer, and updates the second interval based on a fourth time point at which a third acknowledgment frame from among the plurality of third acknowledgement frames which contains a sequence number indicating a last sequence number of the plurality of third data frames is received.

4. The apparatus according to claim 2, wherein the controller is configured to stop a portion of a power supply to at least the second processor based on the transmission interval.

5. The apparatus according to claim 4, wherein if a value of the first interval is the same as a value of the second interval and if said value is not less than a first threshold value, then the controller is configured to stop the portion of the power supply to at least the second processor based on the transmission interval.

6. The apparatus according to claim 3, wherein if a variance of second intervals is not less than a second threshold value, the controller is configured to increase a time for which a portion of a power supply to at least the second processor is stopped.

7. The apparatus according to claim 1, wherein:
a header of each of the plurality of first data frames includes a sequence number indicating a transmission order and a first data continuation identifier indicating whether or not a first data frame to transmit the first data is continued,
each of the first acknowledgement frames notifies a maximum sequence number of continuous sequence numbers in the sequence numbers of the plurality of first data frames which are received and decoded, and
the controller is configured to retain a first sequence number of one of the plurality of first data frames including a first data continuation identifier indicating that said one first data frame is not continued, and to determine that a time point at which a given acknowledgement frame including a sequence number indicating a number not less than the first sequence number is received is the first time point.

8. The apparatus according to claim 7, wherein the first sequence number relating to the first data is deleted when the first time point is determined and wherein if another transmission request is received before the first sequence number relating to the first data is deleted, the first processor is configured to update the first sequence number based on said another transmission request, and determines that a time point at which said given acknowledgement frame including the sequence number that is the same as the updated first sequence number is received is the first time point.

9. The apparatus according to claim 1, wherein:
a header of each of the plurality of first data frames includes a sequence number indicating a transmission order and a first data continuation identifier indicating whether or not a first data frame to transmit the first data is continued,
each of the first acknowledgement frames includes a bit map indicating whether or not each of the plurality of first data frames is received and decoded, and
the controller is configured to retain a first sequence number of one of the plurality of first data frames including a first data continuation identifier indicating that said one first data frame is not continued, and identifies a first maximum sequence number of continuous sequence numbers in sequence numbers of the plurality of first data frames which are received and decoded based on the bit map, and determines that a time point at which a first acknowledgement frame from among the plurality of first acknowledgment frames which includes the identified first maximum sequence number that is not less than the first sequence number is received is the first time point.

10. A wireless communication method, comprising:
generating a plurality of first data frames for transmitting first data if a first transmission request of the first data is received from an upper layer, and generating a plurality of second data frames for transmitting second data if a second transmission request of the second data is received from the upper layer after receipt of the first transmission request from the upper layer, the plurality of first data frames and the plurality of second data frames being frames used on a media access control layer;
converting the plurality of first data frames and the plurality of second data frames into a plurality of first physical packets;
transmitting the plurality of first physical packets through one or more antennas;

receiving, through the one or more antennas, a plurality of second physical packets and converting the plurality of second physical packets into a plurality of first acknowledgement frames and a plurality of second acknowledgement frames, the plurality of first acknowledgement frames corresponding to the plurality of first data frames and used on the media access control layer, and the plurality of second acknowledgement frames corresponding to the plurality of second data frames and used on the media access control layer, each of the first acknowledgement frames and the second acknowledgement frames containing a sequence number field which indicates a maximum sequence number of successively received sequence numbers;

retaining a first interval relating to a time interval between the first transmission request and the second transmission request, and a second interval relating to a time interval between a first time point and a second time point;

comparing the first interval and the second interval; and controlling transmission of frames on the media access control layer based on a result of the comparison between the first interval and the second interval, wherein the first time point is a time point at which a first acknowledgment frame from among the plurality of first acknowledgement frames which contains a sequence number indicating a last sequence number of the plurality of first data frames is received, and the second time point is a time point at which a second acknowledgment frame from among the plurality of second acknowledgement frames which contains a sequence number indicating a last sequence number of the plurality of second data frames is received.

11. The method according to claim 10, wherein controlling transmission of the frames comprises controlling a transmission interval of a frame to be transmitted based on the first interval and the second interval.

12. The method according to claim 10, further comprising:

generating a plurality of third data frames for transmitting third data when a third transmission request of the third data is received from the upper layer;

converting the plurality of third data frames into a plurality of third physical packets;

transmitting the plurality of third physical packets through the one or more antennas;

receiving, through the one or more antennas, a plurality of fourth physical packets and converting the plurality of fourth physical packets into a plurality of third acknowledgement frames corresponding to the plurality of third data frames; and updating the first interval based on a third time point at which the third transmission request is received from the upper layer, and updating the second interval based on a fourth time point at which a third acknowledgment frame from among the plurality of third acknowledgement frames which contains a sequence number indicating a last sequence number of the plurality of third data frames is received.

13. The method according to claim 11, further comprising stopping a portion of a power supply based on the transmission interval.

14. The method according to claim 13, wherein if a value of the first interval is the same as a value of the second interval and if said value is not less than a first threshold value, then the portion of the power supply is stopped based on the transmission interval.

15. The method according to claim 12, further comprising if a variance of second intervals is not less than a second threshold value, increasing a time for which a portion of a power supply is stopped.

16. The method according to claim 10, wherein a header of each of the plurality of first data frames includes a sequence number indicating a transmission order and a first data continuation identifier indicating whether or not a first data frame to transmit the first data is continued, wherein each of the first acknowledgement frames notifies a maximum sequence number of continuous sequence numbers in the sequence numbers of the plurality of first data frames which are received and decoded, and wherein the method further comprises retaining a first sequence number of one of the plurality of first data frames including a first data continuation identifier indicating that said one first data frame is not continued, and determining that a time point at which a given acknowledgement frame including a sequence number indicating a number not less than the first sequence number is received is the first time point.

17. The method according to claim 16, further comprising:

deleting the first sequence number relating to the first data when the first time point is determined; and if another transmission request is received before the first sequence number relating to the first data is deleted, updating the first sequence number based on said another transmission request, and determining that a time point at which said given acknowledgement frame including the sequence number that is the same as the updated first sequence number is received is the first time point.

18. The method according to claim 10, wherein:

a header of each of the plurality of first data frames includes a sequence number indicating a transmission order and a first data continuation identifier indicating whether or not a first data frame to transmit the first data is continued, each of the first acknowledgement frames includes a bit map indicating whether or not each of the plurality of first data frames is received and decoded, and the method further comprises retaining a first sequence number of one of the plurality of first data frames including a first data continuation identifier indicating that said one first data frame is not continued, and identifying a first maximum sequence number of continuous sequence numbers in sequence numbers of the plurality of first data frames which are received and decoded based on the bit map, and determining that a time point at which a first acknowledgement frame from among the plurality of first acknowledgment frames which includes the identified first maximum sequence number that is not less than the first sequence number is received is the first time point.

19. The apparatus according to claim 1, further comprising the one or more antennas configured to transmit the plurality of first physical packets and receive the plurality of second physical packets.

* * * * *